(12) United States Patent
Yoshimoto et al.

(10) Patent No.: US 10,689,015 B2
(45) Date of Patent: Jun. 23, 2020

(54) INFORMATION PROCESSING SYSTEM, AND MAINTENANCE TERMINAL

(71) Applicant: Mitsubishi Electric Corporation, Chiyoda-ku, Tokyo (JP)

(72) Inventors: Koki Yoshimoto, Tokyo (JP); Sae Kimura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 43 days.

(21) Appl. No.: 16/098,279

(22) PCT Filed: Feb. 1, 2017

(86) PCT No.: PCT/JP2017/003538
§ 371 (c)(1),
(2) Date: Nov. 1, 2018

(87) PCT Pub. No.: WO2017/195408
PCT Pub. Date: Nov. 16, 2017

(65) Prior Publication Data
US 2019/0144021 A1     May 16, 2019

(30) Foreign Application Priority Data
May 11, 2016 (JP) ................. 2016-094982

(51) Int. Cl.
*G01M 17/00* (2006.01)
*B61L 15/00* (2006.01)
(Continued)

(52) U.S. Cl.
CPC ............. *B61L 15/0081* (2013.01); *B60L 3/00* (2013.01); *B61L 15/0072* (2013.01);
(Continued)

(58) Field of Classification Search
CPC ..... B61L 15/0081; B61L 15/0072; B60L 3/00
See application file for complete search history.

(56) References Cited

U.S. PATENT DOCUMENTS

2006/0289620 A1   12/2006  Yamamoto et al.
2018/0284735 A1*  10/2018  Cella .................. G05B 23/0289
2019/0339688 A1*  11/2019  Cella .................... G06K 9/6263

FOREIGN PATENT DOCUMENTS

JP     H08251702 A    9/1996
JP     2003132167 A   5/2003
(Continued)

OTHER PUBLICATIONS

International Search Report (with English Translation) and Written Opinion issued in International Patent Application No. PCT/JP2017/003538, (dated May 9, 2017) 8 pages.

*Primary Examiner* — Adam M Alharbi
(74) *Attorney, Agent, or Firm* — Buchanan Ingersoll & Rooney PC

(57) ABSTRACT

An information processing system according to the present disclosure includes: an identification data acquirer to acquire first classification information indicating a classification of equipment mounted on a train, first positional information including a formation number of the train, and an equipment identification number unique to the equipment that are transmitted to a maintenance terminal; a vehicle management data acquirer to acquire second classification information indicating a classification of the equipment, second positional information including a formation number of the train, and equipment state information indicating a state of the equipment that are held in a device mounted on the train; and a state history identifier to associate the equipment state information and the equipment identification number with each other upon determination that the first positional information and the second positional information match each
(Continued)

other, and the first classification information and the second classification information match each other.

9 Claims, 12 Drawing Sheets

(51) Int. Cl.
  *B61L 25/00* (2006.01)
  *B60L 3/00* (2019.01)
  *B61L 27/00* (2006.01)
  *G07C 5/08* (2006.01)
(52) U.S. Cl.
  CPC ........... *B61L 25/00* (2013.01); *B61L 27/0077* (2013.01); *G07C 5/085* (2013.01); *G07C 5/0816* (2013.01)

(56) References Cited

FOREIGN PATENT DOCUMENTS

| | | | |
|---|---|---|---|
| JP | 2005084962 A | 3/2005 | |
| JP | 2008029110 A | 2/2008 | |

\* cited by examiner

FIG. 2
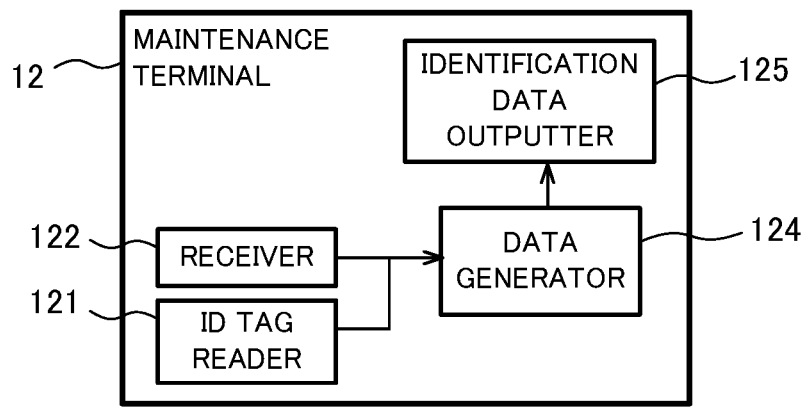
FIG. 3
| TAG DATA | FORMATION NUMBER | INSTALLATION POSITION |
|---|---|---|
| V5043 – 2134539 | 57 | FRONT OF VEHICLE NO. 3 |
| D42a1 – 1324987 | 57 | MIDDLE OF VEHICLE NO. 3 |
| Bd3a5 – 3450897 | 57 | MIDDLE OF VEHICLE NO. 3 |
FIG. 4
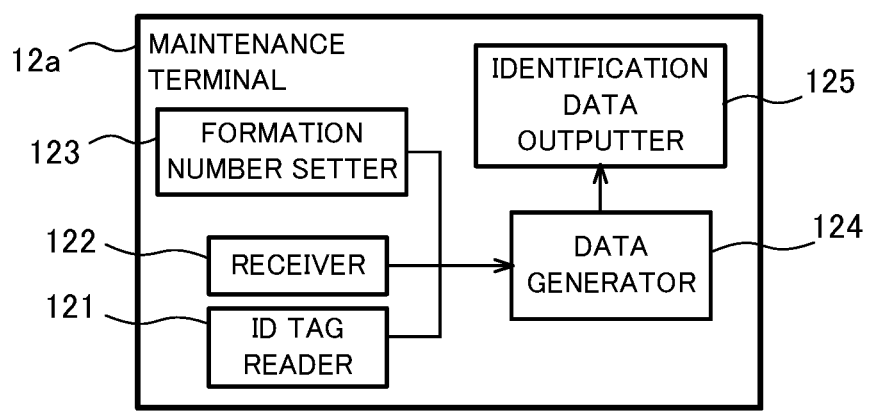

FIG. 5

| EQUIPMENT NO. | EQUIPMENT CLASSIFICATION | FORMATION NUMBER | INSTALLATION POSITION |
|---|---|---|---|
| 1 | VVVF(V4261) | 57 | FRONT OF VEHICLE NO. 1 |
| 2 | VVVF(V5043) | 57 | FRONT OF VEHICLE NO. 3 |
| 3 | DOOR(Dd3a5) | 57 | FRONT MOUNTAIN SIDE OF VEHICLE NO. 1 |
| 4 | DOOR(Da3e5) | 57 | FRONT OCEAN SIDE OF VEHICLE NO. 1 |
| 5 | DOOR(Dg3n3) | 57 | REAR MOUNTAIN SIDE OF VEHICLE NO. 1 |
| 6 | DOOR(De3u9) | 57 | REAR OCEAN SIDE OF VEHICLE NO. 1 |
| 7 | VVVF(V4263) | 57 | FRONT OF VEHICLE NO. 2 |
| 8 | VVVF(V4372) | 57 | REAR OF VEHICLE NO. 2 |

FIG. 6

| EQUIPMENT NO. | TIME | CURRENT | VOLTAGE | SPEED | FREQUENCY |
|---|---|---|---|---|---|
| 2 | 2015/12/11 10:21:10.0 | 755.9 | 1406.3 | 59 | 0.4 |
| | 2015/12/11 10:21:10.1 | 1228.3 | 1398.4 | 57.5 | 2.7 |
| | 2015/12/11 10:21:10.2 | 1244.1 | 1390.6 | 58 | 3.2 |
| | 2015/12/11 10:21:10.3 | 1244.1 | 1390.6 | 58 | 3.8 |
| | 2015/12/11 10:21:10.4 | 1259.8 | 1398.4 | 59 | 4.3 |

| EQUIP-MENT NO. | EQUIPMENT IDENTIFI-CATION NUMBER | TIME | CURRENT | VOLTAGE | SPEED | FRE-QUENCY |
|---|---|---|---|---|---|---|
| 2 | 2134539 | 2015/12/11 10:21:10.0 | 755.9 | 1406.3 | 59 | 0.4 |
| | | 2015/12/11 10:21:10.1 | 1228.3 | 1398.4 | 57.5 | 2.7 |
| | | 2015/12/11 10:21:10.2 | 1244.1 | 1390.6 | 58 | 3.2 |
| | | 2015/12/11 10:21:10.3 | 1244.1 | 1390.6 | 58 | 3.8 |
| | | 2015/12/11 10:21:10.4 | 1259.8 | 1398.4 | 59 | 4.3 |

FIG. 8A — PROCESSOR (51), STORAGE (52), COMMUNICATION DEVICE (53)

FIG. 8B — PROCESSOR (61), STORAGE (62), COMMUNICATION DEVICE (63), COMMUNICATION DEVICE (64), HDD (65)

FIG. 8C — PROCESSOR (71), STORAGE (72), TRANSMITTER (73), RECEIVER (74), READER (75)

FIG. 8D — PROCESSOR (71), STORAGE (72), TRANSMITTER (73), RECEIVER (74), READER (75), INPUTTER (76)

FIG. 10

| EQUIP-MENT NO. | EQUIPMENT IDENTIFI-CATION NUMBER | EQUIPMENT CLASSIFI-CATION | FORMATION NUMBER | INSTALLATION POSITION |
|---|---|---|---|---|
| 1 | | VVVF(V4261) | 57 | FRONT OF VEHICLE NO. 1 |
| 2 | 2134539 | VVVF(V5043) | 57 | FRONT OF VEHICLE NO. 3 |
| 3 | | DOOR(Dd3a5) | 57 | FRONT MOUNTAIN SIDE OF VEHICLE NO. 1 |
| 4 | | DOOR(Da3e5) | 57 | FRONT OCEAN SIDE OF VEHICLE NO. 1 |
| 5 | | DOOR(Dg3n3) | 57 | REAR MOUNTAIN SIDE OF VEHICLE NO.1 |
| 6 | | DOOR(De3u9) | 57 | REAR OCEAN SIDE OF VEHICLE NO. 1 |
| 7 | | VVVF(V4263) | 57 | FRONT OF VEHICLE NO. 2 |
| 8 | | VVVF(V4372) | 57 | REAR OF VEHICLE NO. 2 |

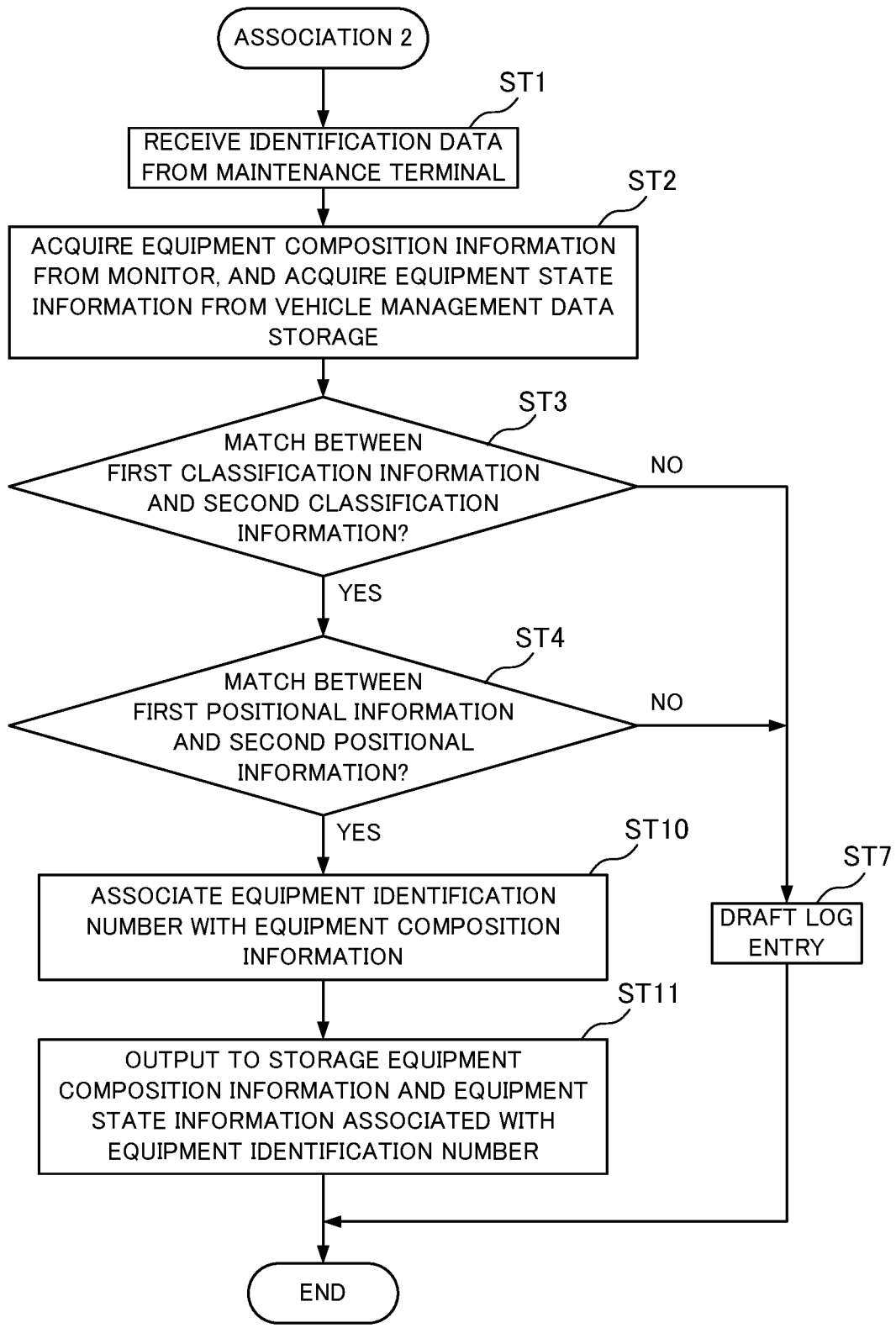

INFORMATION PROCESSING SYSTEM, AND MAINTENANCE TERMINAL

TECHNICAL FIELD

The present disclosure relates to an information processing device, an information processing system, and an information processing method that are used for management of equipment state information of equipment that is mounted on a train.

BACKGROUND ART

In the field of railroads, in order to ensure safe and reliable travel, mandatory maintenance work by inspecting and servicing equipment mounted on a vehicle is performed periodically or each time a fixed distance is traveled. Very high costs are incurred by using personnel to maintain each of the equipment units mounted on the vehicle. Thus a vehicle management device is used to perform integrated management by connecting via a network to each of the equipment units mounted on the vehicle, and collecting state information of the equipment mounted on the vehicle. Examples of the state information of the equipment include hours of operation, an operation frequency, a voltage, a current, a rotation speed, a frequency, or a temperature history of the equipment, or a notification of a result of a failure diagnosis from the equipment. The collected state information of the equipment is used, for example, to enable determination concerning a deterioration state of the equipment, or whether servicing of the equipment is required, and the collected state information can be employed in the maintenance of the equipment.

For example, Patent Literature 1 describes a management device for equipment mounted on a railway vehicle for which an operational history of mounted equipment is to be recorded for maintenance. For the management device of Patent Literature 1, an equipment identification number is assigned to the equipment that is the subject of maintenance of mounted equipment, the management device is equipped with a recording part for recording a maintenance management characteristic value, and the management device receives information from the mounted equipment, and arranges and records information on the mounted equipment under management. In addition to recording a history of the mounted equipment under management, the management device monitors the mounted equipment and generates management information in accordance with maintenance standards.

CITATION LIST

Patent Literature

Patent Literature 1: Unexamined Japanese Patent Application Kokai Publication No. H08-251702

SUMMARY OF INVENTION

Technical Problem

In order to be used for maintenance of equipment state information of the equipment mounted on the train, such a vehicle management device is required to perform management by clearly associating a given equipment unit with the equipment state information. In Patent Literature 1, the equipment identification number is assigned in order to distinguish the maintenance-target equipment from other equipment. By reading the equipment identification number from the maintenance-target equipment via the network, the vehicle management device performs management in a manner that enables understanding of which equipment unit is the equipment of the equipment state information.

Upon determination that servicing of mounted equipment is required in the maintenance operations of equipment in the field of railroads, servicing is sometimes performed, for example, by replacing an article with a replacement article. Further, after equipment is removed for periodic inspection, the equipment is sometimes installed in a vehicle other than the vehicle from which the equipment is previously removed. Although the mounted equipment outputs the state information of the equipment, often there is no function for outputting to the vehicle management device an equipment identification number for distinguishing the mounted equipment from other equipment. In this case, when equipment management is insufficient due to the equipment identification number not being output together with the state information output from the equipment, even assuming that past equipment state information of the replacement equipment exists, for example, the present equipment state information output by the replacement equipment is difficult to associate with the past equipment state information. Thus a problem exists in that accurate information concerning the state information of the equipment cannot be constructed, and the state information of the equipment cannot be used for maintenance inspection.

An objective of the present disclosure is to solve the aforementioned problem by providing an information processing system, and a maintenance terminal capable of constructing accurate information relating to the state information of the equipment more easily than heretofore, and enabling use of the equipment state information for maintenance inspection.

Solution to Problem

An information processing system according to a first aspect of the present disclosure includes: an identification data acquirer to acquire (i) first classification information indicating a classification of equipment mounted on a train, (ii) first positional information including a formation number of the train, and (iii) an equipment identification number unique to the equipment that are transmit to a maintenance terminal; a vehicle management data acquirer to acquire (i) second classification information indicating a classification of the equipment, (ii) second positional information including a formation number of the train, and (iii) equipment state information indicating a state of the equipment that are held in a device mounted on the train; and a state history identifier to associate the equipment state information and the equipment identification number with each other upon determination that (i) the first positional information and the second positional information match each other, and (ii) the first classification information and the second classification information match each other.

A maintenance terminal according to a second aspect of the present disclosure used in a management system for managing equipment state information indicating a state of an equipment mounted on a train, the maintenance terminal includes:

a reader to read an identification information of the equipment mounted on the train;

an inputter to input information about a formation of the train and/or information indicating an installation position of the equipment within the train; and a data generator to associate the information about the formation of the train and/or the information indicating the installation position of the equipment with the identification information.

Advantageous Effects of Invention

Per the information processing device, the information processing system, and the information processing method according to the present disclosure, accurate information relating to the equipment state information of the equipment can be more easily constructed than conventionally, and the equipment state information can be used for maintenance inspection.

BRIEF DESCRIPTION OF DRAWINGS

FIG. 2 is a block diagram of a maintenance terminal according to Embodiment 1;

FIG. 3 is a drawing illustrating an example of identification data according to Embodiment 1;

FIG. 4 is a drawing illustrating a modified example of the maintenance terminal of the information processing system according to Embodiment 1;

FIG. 5 is a drawing illustrating an example of equipment composition information according to Embodiment 1;

FIG. 6 is a drawing illustrating an example of equipment state information according to Embodiment 1;

FIG. 8A is a hardware configuration diagram of a vehicle management device according to Embodiment 1;

FIG. 8B is a hardware configuration diagram of a ground-based management device according to Embodiment 1;

FIG. 8C is a hardware configuration diagram of the maintenance terminal according to Embodiment 1;

FIG. 8D is a hardware configuration diagram of a maintenance terminal according to a modified example of Embodiment 1;

FIG. 10 is a drawing illustrating an example of equipment composition information in which an equipment identification number is associated according to Embodiment 2 of the present disclosure;

FIG. 11 is a flowchart for description of association processing of a state history identifier of an information processing device according to Embodiment 2;

DESCRIPTION OF EMBODIMENTS

Embodiment 1

Figure 1:
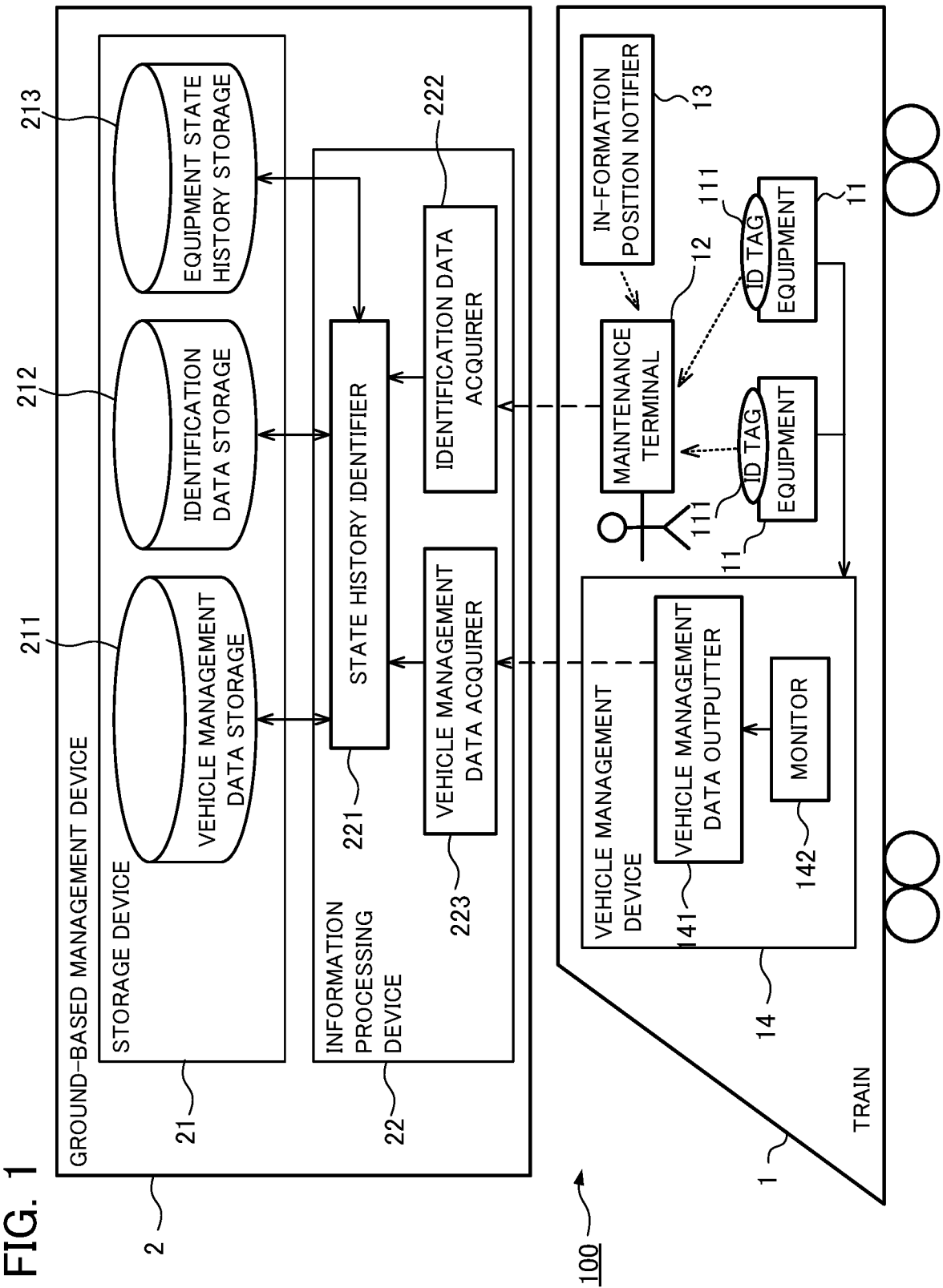
FIG. 1 is a block diagram of an information processing system according to Embodiment 1 of the present disclosure.

An information processing system 100 according to Embodiment 1 of the present disclosure is described with reference to FIGS. 1 to 9. In the drawings, components that are the same or equivalent are assigned the same reference signs, and such assignment is used throughout the specification.

FIG. 1 is a block diagram of the information processing system according to Embodiment 1 of the present disclosure. The information processing system 100 according to Embodiment 1 is a system for storing equipment state information such as the hours of operation, the operation frequency, the voltage, the current, the rotation speed, the frequency, the temperature, and the like of equipment 11 mounted on a train 1, and is used for understanding a state of the equipment 11. By use of the equipment state information stored by the information processing system 100, determination is made as to a deterioration state of the equipment 11 or whether servicing is required. Further, the equipment state information may include information such as notification of a result of a failure diagnosis from the equipment 11. Although a single vehicle of the train 1 is illustrated in FIG. 1, the train 1 is formed as a formation of one vehicle or multiple vehicles. In the embodiments, the train 1 is envisioned as being formed as a formation of multiple vehicles.

The information processing system 100 is equipped with the equipment 11, an in-formation position notifier 13, and a vehicle management device 14 mounted on the train 1, a maintenance terminal 12 held by a worker, and an information processing device 22 and a storage device 21 arranged at a ground-based management device 2.

Examples of the equipment 11 mounted on the vehicle include components such as a motor, a brake, an inverter, air-conditioning equipment, a door, and the like, and each of such components may be present as a single component or multiple components on the train 1. Further, each equipment 11 is equipped with an identification (ID) tag 111 that has tag data. The tag data includes: first classification information indicating a classification of the equipment 11 mounted on the vehicle, and an equipment identification number that is a unique number among equipment types and that provides distinction from other equipment 11. Examples of the ID tag 111 include a two-dimensional code, a barcode, and an IC tag.

The maintenance terminal 12 is capable of being carried about by the worker, and is a terminal used by the worker such as a tablet terminal, a notebook personal computer, and the like. For example, at times such as when the equipment 11 is introduced, the equipment 11 is replaced, or the equipment 11 is maintained, the worker holds the maintenance terminal 12 and operates such within or in the vicinity of the train 1. The maintenance terminal 12 acquires the first classification information and the equipment identification number of the ID tag 111 with which the equipment 11 is equipped.

FIG. 2 is a block diagram of the maintenance terminal according to Embodiment 1. The maintenance terminal 12 is equipped with an ID tag reader 121, a receiver 122, a data generator 124, and an identification data outputter 125.

Upon approaching the ID tag 111 with which the equipment 11 is equipped, the ID tag reader 121 reads the tag data from the ID tag 111 and outputs the read tag data to the data generator 124.

The receiver 122 receives electromagnetic or acoustic waves emitted by the in-formation position notifier 13 with which the train 1 is equipped. The receiver 122 outputs to the data generator 124 information of the received electromagnetic or acoustic waves. The electromagnetic or acoustic waves generated by the in-formation position notifier 13 include at least information such as a formation number allocated to the train 1, such as "57", for example.

On the basis of the tag data read from the ID tag reader 121 and the information of the electromagnetic or acoustic waves output by the receiver 122, the data generator 124 generates the identification data including: the first classification information indicating the classification of the equipment 11, the first positional information including the formation number allocated to the train 1, and the unique equipment identification number for distinguishing between the equipment 11 and other equipment. Rather than just the formation number, the first positional information may further include information relating to a specific installation position or an in-formation position of the equipment 11, such as "front of vehicle number 3 in formation number '57'".

FIG. 3 is a drawing illustrating an example of the identification data according to Embodiment 1. The data generator 124 of the maintenance terminal 12 combines the tag data 80 having the first classification information 83 and the equipment identification number 84 with the first positional information having the formation number 81 and an installation position 82, and then passes the combined information as identification data 90 to the identification data outputter 125. In the example of FIG. 3, a model number of the equipment 11, expressed as a 5-character alphanumeric lettering, is used as an example of the first classification information 83.

The identification data 90 generated using the data generator 124 is output from the identification data outputter 125 of the maintenance terminal 12 to an identification data acquirer 222 of an information processing device 22 arranged at the ground-based management device 2. The identification data 90 may be output wirelessly, or by wired communication, to the identification data acquirer 222 of the information processing device 22. The identification data 90 may be output to the identification data acquirer 222 via a cloud storage or a recording medium such as a memory card. The method for outputting from the identification data outputter 125 to the identification data acquirer 222 is not limited to these examples.

FIG. 4 is a drawing illustrating a modified example of the maintenance terminal of the information processing system according to Embodiment 1. In comparison to the maintenance terminal 12 illustrated in FIG. 2, a maintenance terminal 12a illustrated in FIG. 4 is further equipped with a formation number setter 123. The worker uses the maintenance terminal 12a to directly enter the formation number 81 via the formation number setter 123. Further, by connecting the maintenance terminal 12 to the vehicle management device 14, the maintenance terminal 12 may be configured to acquire the formation number 81 from the vehicle management device 14. In this case, the in-formation position notifier 13 is not required to send the formation number 81. Further, a configuration may be used in which the worker uses the formation number setter 123 to directly input the installation position 82 indicating the position of the equipment 11 within the train 1. That is to say, a configuration may be used in which the worker uses the formation number setter 123 to directly enter the first positional information.

One or more of the in-formation position notifier 13 are provided for the train 1, and output the electromagnetic or acoustic waves. The in-formation position notifier 13 is sometimes referred to hereinafter simply as the notification device 13. The electromagnetic or acoustic waves output from the notification device 13 are used in order for the data generator 124 of the maintenance terminal 12 to estimate the formation number 81 and the installation position 82 of the equipment 11. The outputted electromagnetic or acoustic waves include at least the information of the formation number 81, and thus the data generator 124 of the maintenance terminal 12 can estimate the formation number 81 allocated to the train 1 in which the equipment 11 is installed. Further, the outputted electromagnetic or acoustic waves include the ID or the positional information of the notification device 13, thereby enabling an understanding of the position of the notification device 13. In the case of use of the ID, the terminal is equipped with an association drawing for associating the ID with the position of the notification device 13. When using the maintenance terminal 12 to read the ID tag 111 of the equipment 11, the worker estimates the simultaneously understood position of the notification device 13 to be the position of the equipment 11. Alternatively, the outputted electromagnetic or acoustic waves are used for estimating the position itself of the equipment 11. The formation number setter 123 of the maintenance terminal 12 may be equipped with a button that starts the estimation of the position of the equipment 11. In such a case, the position of the equipment 11 is estimated upon pressing of the button.

Examples of the notification device 13 include a wireless LAN beacon, a Bluetooth (registered trademark) beacon, an LED transmitter, a speaker, and an ID tag. If a wireless LAN or Bluetooth (registered trademark) base unit is used as the notification device 13, the base unit or beacon transmits as data an identification code of the position or the positional information itself. Alternatively, the position of the equipment 11 may be deduced from strength of the electromagnetic waves transmitted by the notification device 13 and received by the maintenance terminal 12. If the LED transmitter is used as the notification device 13, the identification code of the position or the positional information is transmitted using visible or infrared light communication. If the speaker is used as the notification device 13, the identification code of the position or the positional information is transmitted using an acoustic wave as a carrier wave. If acoustic waves are used, a frequency is preferably used that is outside the audible frequencies that humans can hear. Further, the distance between the speaker and the equipment 11 may be deduced by measurement of a period between transmission and reception of the acoustic waves. For example, the period from transmission by the notification device 13 until reception by the maintenance terminal 12 can be known on the basis of a period for a roundtrip of sound between the maintenance terminal 12 and the notification device 13.

For example, a case is described in which the train 1 is equipped with a single notification device 13, which is provided at the front of the vehicle number 3. The formation number allocated to the train 1 is assumed to be "57". The notification device 13 generates the electromagnetic or acoustic waves that include information indicating, for example, "front of the vehicle number 3 of formation number '57'". When the worker uses the maintenance terminal 12 to read the ID tag of the equipment 11, the maintenance terminal 12 estimates the position of the equipment 11 on the basis of the electromagnetic or acoustic waves received from the notification device 13. In order to estimate the distance between the notification device 13 and the equipment 11 for which the ID tag is read by the worker using the maintenance terminal 12, the distance to the notification device 13 is obtained, for example, based on signal reception strength by referencing a table indicating a relationship between the signal reception strength of the electromagnetic or acoustic waves and the distance from the notification device 13. The table records, for example, the installation position of the notification device 13, as well as a relationship between the position within the train 1 and the signal reception strength of the electromagnetic or acoustic wave generated from the notification device 13. Such a table may be stored in an internal memory of the maintenance terminal 12, or a configuration may be used in which the maintenance terminal 12 refers to a table that is stored by the vehicle management device 14.

A case is describe in which the train 1 is equipped with multiple notification devices 13, and among the notification devices 13, one is provided at the front of the number 3 vehicle. A case is considered here in which the notification device 13 is closest to the equipment 11 provided in the vicinity of the "front of vehicle number 3 of formation number '57'", and the worker uses the maintenance terminal 12 to read the ID tag of the equipment 11. The notification device 13 generates electromagnetic or acoustic waves that include information indicating the "front of vehicle number 3 of formation number '57'". When the worker uses the maintenance terminal 12 to read the ID tag of the equipment 11 that is located at the "front of vehicle number 3 of formation number '57'", the data generator 124 of the maintenance terminal 12 extracts the electromagnetic or acoustic waves having the greatest signal reception strength among the electromagnetic or acoustic waves received by the receiver 122. The data generator 124 of the maintenance terminal 12, on the basis of the extracted electromagnetic or acoustic waves having the greatest signal reception strength, can determine that the equipment 11 is located at the "front of vehicle number 3 of formation number '57'", and can estimate the position of the equipment 11.

Further, rather than using just the electromagnetic or acoustic waves having the greatest signal reception strength, the data generator 124 of the maintenance terminal 12 may deduce the position of the equipment 11 by use of electromagnetic or acoustic waves generated by another notification device 13. Using multiple receivable electromagnetic or acoustic waves enables an improvement of the accuracy of estimation of the position of the equipment 11 relative to the case in which a single electromagnetic or acoustic wave is used.

In the case in which the train 1 is equipped with multiple notification devices 13, the installation position of the notification device 13 and the relationship between position within the train 1 and the signal reception strength of the electromagnetic or acoustic waves generated from the notification device 13 are recorded, for each respective notification device 13, in the drawing of signal reception strength and distance. In an example, the installation position of a first in-formation position notifier 13 is assumed to be "front of vehicle number 3 of formation number '57'", the signal reception strength for "front of vehicle number 3 of formation number '57'" is assumed to be strong, and the signal reception strength for "rear of vehicle number 3 of formation number '57'" is assumed to be weak. Further, the installation position of a second in-formation position notifier 13 is assumed to be "rear of vehicle number 3 of formation number '57'", the signal reception strength for "rear of vehicle number 3 of formation number '57'" is assumed to be strong, and the signal reception strength for "front of vehicle number 3 of formation number '57'" is assumed to be weak. Thus when the strength of the electromagnetic or acoustic waves received by the maintenance terminal 12 is weak for the first in-formation position notifier 13 and is strong for the second in-formation position notifier 13, the equipment 11 can be easily estimated to be located at the "rear of vehicle number 3 of formation number '57'". Further, whether the electromagnetic or acoustic waves received by the maintenance terminal 12 are electromagnetic or acoustic waves generated from the first in-formation position notifier 13 or from the second in-formation position notifier 13 can be easily distinguished by a difference in frequency. Thus by using a table of signal reception strength and distance that is specific for the notification device 13, the data generator 124 of the maintenance terminal 12 can improve the accuracy of estimation of the position of the equipment 11.

For the estimation of the installation position 82 of the equipment 11, a method may be used of including in the electromagnetic or acoustic waves output from the notification device 13 an identification code of the notification device 13 that differs according to the notification device 13. The data generator 124 of the maintenance terminal 12, on the basis of the identification code, can easily estimate from which notification device 13 the electromagnetic or acoustic waves come. Thus the data generator 124 of the maintenance terminal 12 can easily estimate the formation number 81 or the installation position 82 of the equipment 11. Further, rather than the identification code, the positional information itself of the notification device 13 may be included in the electromagnetic or acoustic waves output from the notification device 13.

Further, the train 1 may be equipped with multiple notification devices 13 that each generate the electromagnetic or acoustic waves of a different respective frequency, and the information relating to the installation position 82 of the equipment 11 having the first positional information may be generated by the maintenance terminal 12 on the basis of the frequency of the electromagnetic or acoustic waves having the largest signal reception strength at the maintenance terminal 12. In this case, the maintenance terminal 12 is required to be capable of knowing the association between the notification device 13 and the frequency.

Although the information relating to the installation position 82 of the equipment 11 having the first positional information is assumed in the aforementioned example to be generated by the data generator 124 of the maintenance terminal 12, this information may be generated by a state history identifier 221 of the information processing device 22.

As illustrated in FIG. 1, the vehicle management device 14 is arranged in the train 1, and is equipped with a monitor 142 and a vehicle management data outputter 141.

The monitor 142 is connected via a network to the equipment 11, and collects and records equipment state information including at least one of the voltage, the current, the temperature, the hours of operation, the operation frequency, the rotation speed, the frequency, the pressure, or the failure diagnosis result from the equipment 11. The monitor 142 may collect the equipment state information periodically, such as every 100 msec, or alternatively, may intensely collect the equipment state information sent from the equipment 11, for example, when the voltage, the current, the temperature, the rotation speed, the frequency, or the like displays a value that is not within a predetermined range. Further, the monitor 142 possesses beforehand equipment composition information that indicates which equipment 11 is provided for each of the vehicles of the train 1. The equipment composition information is output by the vehicle management device 14 mounted on the train 1, and has second classification information indicating the classification of the equipment 11 and a second positional information including the formation number allocated to the train 1.

The vehicle management data outputter 141 of the vehicle management device 14 transmits to the ground-based management device 2 the equipment state information collected by the monitor 142, together with the equipment composition information. The vehicle management data outputter 141 may wirelessly transmit to the ground-based management device 2 the equipment state information at each measurement by the monitor 142 of the equipment state information, or may transmit by wireless or wired communication to the ground-based management device 2 the equipment state information collectively for a fixed time period, such as a one-day portion. The frequency of the transmission of the equipment state information is not limited to these examples. The output method of the equipment state information and the equipment composition information is not limited to the methods of these examples, and the outputting may be from the vehicle management device 14 to the ground-based management device 2 via a cloud storage or a recording medium such as a memory card.

FIG. 5 is a drawing illustrating an example of the equipment composition information according to Embodiment 1. The equipment number 85 illustrated in the equipment composition information 91 of FIG. 5 is a number for management of the equipment 11 mounted on the train 1, and is possessed beforehand by the monitor 142. FIG. 5 illustrates an example of the equipment composition information 91 allocating to each unit of the equipment 11 an equipment number 85 managed as a number from 1 to 8. In the example of FIG. 5, information of second classification information 83*a*, a formation number 81*a*, and an installation position 82*a* are associated with each of the equipment numbers 85. In FIG. 5, variable voltage variable frequency (VVVF) inverters and doors are illustrated as examples of the equipment.

The second classification information 83*a* illustrated in FIG. 5 includes a name of the equipment 11 and a model number of the equipment 11 indicated in alphanumeric lettering within parentheses. The model number of the equipment 11 corresponds to the model number of the equipment 11 that is the first classification information 83 of the tag data 80.

In FIG. 5, the installation position 82*a* is further recorded and indicates information of the approximate position of disposal of the equipment 11 within the train 1. In the installation position 82*a*, each of the "mountain side" and the "ocean side" indicates doors for passenger boarding and disembarking at the respective side direction. The installation position indicated by the "mountain side" and the "ocean side" is predetermined. For example, if the "mountain side" is at the left side as viewed in the direction of up forward progress of the train 1, the "ocean side" then indicates the right side as viewed in the direction of up forward progress of the train 1. The designations may be reversed. The terms "mountain side" and "ocean side" are text strings determined for convenience in order to specify the position on the vehicle, and other text strings may be used if such text strings enable the installation position 82*a* to specify the installation position.

FIG. 6 is a drawing illustrating an example of the equipment state information according to Embodiment 1. FIG. 6 illustrates equipment state information 92 of the equipment 11 sent from the specific equipment 11 to the vehicle management device 14, and illustrates time-series trending of, for example, the current, the voltage, the speed, and the frequency. In the equipment state information 92 illustrated in FIG. 6, the equipment number 85*a* is "2", and thus the equipment number 85 of the equipment composition information 91 is understood to correspond to the "2" equipment 11. Further, in the same manner as the equipment composition information 91 of FIG. 5, the equipment state information 92 illustrated in FIG. 6 does not include the equipment identification number 84.

As illustrated in FIG. 1, the information processing device 22 of the ground-based management device 2 includes the identification data acquirer 222, a vehicle management data acquirer 223, and the state history identifier 221.

The identification data acquirer 222 acquires from the identification data outputter 125 of the maintenance terminal 12 the identification data 90 including: the first classification information 83 of the equipment 11 mounted on the train 1, the first positional information including the formation number 81 allocated to the train 1, and the unique equipment identification number 84 for distinguishing between the equipment 11 and other equipment 11. The identification data acquirer 222 transmits the acquired identification data 90 to the state history identifier 221.

The vehicle management data acquirer 223 acquires from the vehicle management data outputter 141 of the vehicle management device 14 the equipment state information 92 of the equipment 11, and the equipment composition information 91 having the second positional information including the formation number 81*a* allocated to the train 1, and the second classification information 83*a* indicating the classification of the equipment 11 output from the vehicle management device 14 mounted on the train 1. The vehicle management data acquirer 223 transmits to the state history identifier 221 the acquired equipment composition information 91 and equipment state information 92.

The state history identifier 221, by checking the identification data 90 of the equipment 11 output by the maintenance terminal 12 against the equipment composition information 91 output by the vehicle management device 14, performs processing to associate the equipment identification number 84 with the equipment state information 92 of the equipment 11. For example, in the case in which the equipment 11 is replaced, although specification is not possible of which equipment 11 is that of the equipment state information 92 output by the vehicle management device 14, the equipment identification number 84 of the corresponding equipment 11 is stored in the equipment state history storage 213 in association with the equipment state information 92, and thus the identity of the equipment 11 of the equipment state information 92 can be easily specified and can be useful for maintenance management.

For example, when equipment 11 mounted on the train 1 is swapped out and then provided to another train, by the state history identifier 221 of the information processing device 22 performing similar association processing concerning the equipment state information 92 output by such equipment 11 provided to the another train, the equipment identification number 84 is associated with the equipment state information 92. Thus by checking against the equipment identification number 84, the equipment state information 92 previously output by the equipment 11 provided for the other vehicle can be easily combined with the present equipment state information 92 output by the equipment 11 provided in the other train. Thus accurate information concerning the equipment state information 92 of the equipment 11 can be constructed more easily than heretofore, the operational history, the total hours of operation, and the like of the replacement equipment can be accurately understood, and the equipment state information 92 can be used for maintenance inspection. Further, even when a replacement of equipment 11 occurs, the equipment 11 can be easily tracked.

The state history identifier 221 obtains the identification data 90 output by the maintenance terminal 12 via the identification data acquirer 222. Further, the state history identifier 221, via the vehicle management data acquirer 223, obtains the equipment composition information 91 and the equipment state information 92 output by the vehicle management device 14. Using the identification data 90, the equipment composition information 91, and the equipment state information 92, the state history identifier 221 determines whether processing is performed to associate the equipment identification number 84 with the equipment state information 92 of the equipment 11.

Specifically, in the case in which the state history identifier 221 determines that there is a match between the first positional information of the identification data 90 and the second positional information of the equipment composition information 91, and further determines that there is a match between the first classification information 83 of the identification data 90 and the second classification information 83a of the equipment composition information 91, then the state history identifier 221 associates the equipment state information 92 with the equipment identification number 84 of the equipment number.

Figure 7:
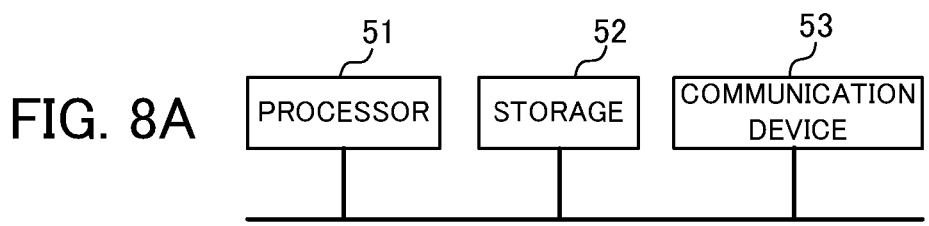
FIG. 7 is a drawing illustrating an example of equipment state information in which an equipment identification number is associated according to Embodiment 1.

FIG. 7 is a drawing illustrating an example of equipment state information in which an equipment identification number is associated according to Embodiment 1. FIG. 7 illustrates an equipment state information 92a in which the equipment identification number 84 is associated with the equipment state information 92 illustrated in FIG. 6.

The state history identifier 221 outputs to the equipment state history storage 213 the equipment state information 92a associated with the equipment identification number 84. In the case in which the first positional information and the second positional information are determined not to match, or in the case in which the first classification information 83 and the second classification information 83a are determined not to match, the state history identifier 221 does not associate the equipment state information 92 and the equipment identification number 84 with each other.

In the case in which, upon comparison between the first positional information and the second positional information, the formation number 81 obtained from the first positional information matches the formation number 81a obtained from the second positional information, and the installation position 82 of the equipment 11 obtained from the first positional information matches the installation position 82a of the equipment 11 obtained from the second positional information, the state history identifier 221 determines that the first positional information and the second positional information match each other. In this case in which the formation number 81 obtained from the first positional information does not match the formation number 81a obtained from second positional information, and/or the installation position 82 of the equipment 11 obtained from the first positional information does not match the installation position 82a of the equipment 11 obtained from the second positional information, the state history identifier 221 determines that the first positional information and the second positional information do not match each other.

In the comparison between the first positional information and the second positional information, for example, in the case of comparison to equipment 11 for which only a single unit is understood to exist on a train, the state history identifier 221 may omit the comparison between the installation position 82 of the equipment 11 obtained from the first positional information and the installation position 82a of the equipment 11 obtained from the second positional information. That is, the state history identifier 221 may perform the determination of whether the first positional information and the second positional information match each other just by the comparison between the formation number 81 obtained from the first positional information and the formation number 81a obtained from the second positional information.

The storage device 21 includes: a vehicle management data storage 211, an identification data storage 212, and an equipment state history storage 213. The vehicle management data storage 211 stores the equipment state information 92 and the equipment composition information 91 output by the vehicle management device 14. The identification data storage 212 stores the identification data 90 output by the maintenance terminal 12. The equipment state history storage 213 stores the equipment state information 92a associated with the equipment identification number 84.

In the case in which the equipment state information 92 stored in the equipment state history storage 213 is not associated with the equipment identification number 84, and the equipment composition information 91 is associated, then the equipment composition information 91 and the equipment state information 92 may be associated with each other and may be stored in the equipment state history storage 213. The equipment state information 92 stored in the equipment state history storage 213 is not limited to these examples and may be stored in the equipment state history storage 213 in any form that allows referencing of the equipment state information 92 of the equipment 11 corresponding to the equipment identification number 84. In the present disclosure, an example is described in which only the equipment state information 92a associated with the equipment identification number 84 by the equipment state history storage 213 is stored.

Although the storage device 21 in Embodiment 1 is assumed to include the vehicle management data storage 211, the identification data storage 212, and the equipment state history storage 213, these storages may be collectively grouped in a single storage. The number of storage devices 21 is not limited to this example, and this number may be freely selected.

FIGS. 8A to 8D are hardware configuration diagrams of various devices included in the information processing system according to Embodiment 1. As illustrated in FIG. 8A, the vehicle management device 14 includes a processor 51, a storage 52, and a communication device 53. The vehicle management data outputter 141 is the communication device 53, and the monitor 142 operates by the processor 51 executing programs stored in the storage 52.

As illustrated in FIG. 8B, the ground-based management device 2 is equipped with a processor 61, a storage 62, a communication device 63, a communication device 64, and a hard disk drive (HDD) 65. The identification data acquirer 222 is the communication device 63, and the state history identifier 221 operates by the processor 61 executing programs stored in the storage 62. The vehicle management data acquirer 223 is the communication device 64. Here, the communication device 64 of the identification data acquirer 222 may be combined with the communication device 64 of the vehicle management data acquirer 223, or may be provided separately. Further, the storage device 21 is the HDD 65, and the HDD 65 unit may be provided for each of the vehicle management data storage 211, the identification data storage 212, and the equipment state history storage 213, or a single HDD 65 may be provided.

As illustrated in FIG. 8C, the maintenance terminal 12 is equipped with a processor 71, a storage 72, a transmitter 73, a receiver 74, and a reader 75. The identification data outputter 125 is the transmitter 73. The processor 71 functions as the data generator 124 of FIG. 2 by executing programs stored in the storage 72. The receiver 122 is the receiver 74 that receives the electromagnetic or acoustic waves generated by the notification device 13. The ID tag reader 121 is the reader 75 that reads the tag data 80 of the ID tag 111 provided for the equipment 11.

As illustrated in FIG. 8D, the maintenance terminal 12 according to the modified example illustrated in FIG. 4 is equipped with the processor 71, the storage 72, the transmitter 73, the receiver 74, the reader 75, and an inputter 76. The processor 71, the storage 72, the transmitter 73, the receiver 74, and the reader 75 are similar to components included in the maintenance terminal 12 of FIG. 8C. The formation number setter 123 of FIG. 4 is the inputter 76 for the worker to directly input the formation number 81.

Figure 9:
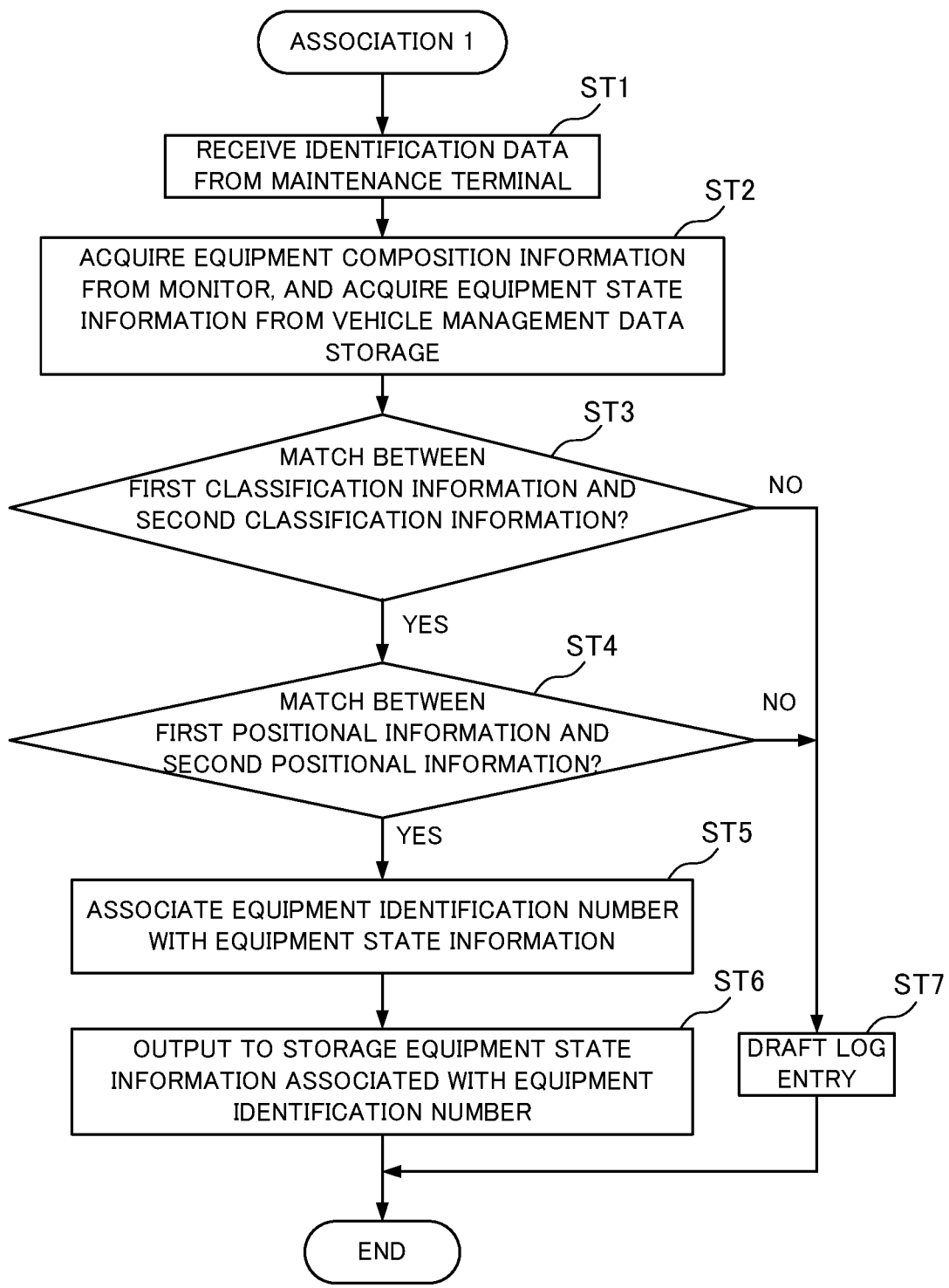
FIG. 9 is a flowchart for description of association processing of a state history identifier of the information processing device according to Embodiment 1.

FIG. 9 is a flowchart for description of association processing of the state history identifier of the information processing device according to Embodiment 1.

In step ST1, the state history identifier 221 receives the identification data 90 from the maintenance terminal 12 via the identification data acquirer 222.

In step ST2, the state history identifier 221 acquires the equipment composition information 91 from the monitor 142 of the vehicle management device 14 via the vehicle management data acquirer 223, and the state history identifier 221 acquires the equipment state information 92 from the vehicle management data storage 211.

In step ST3, the state history identifier 221 determines whether the first classification information 83 within the identification data 90 and the second classification information 83a included in the equipment composition information 91 match each other. Upon determination that these information match each other, processing proceeds to step ST4. Upon determination that these information do not match each other, processing proceeds to step ST7.

In step ST4, the state history identifier 221 determines whether the first positional information within the identification data 90 and the second positional information of the equipment composition information 91 match each other.

Upon the state history identifier 221 determining that the first positional information within the identification data 90 and the second positional information of the equipment composition information 91 match each other, processing proceeds to step ST5, and if this determination is that these information do not match each other, processing proceeds to step ST7.

Further, when the formation number 81 of the first positional information and the formation number 81a of the second positional information do not match each other and the installation position 82 of the first positional information and the installation position 82a of the second positional information do not match each other in step ST4, the state history identifier 221 determines that the first positional information within the identification data 90 and the second positional information of the equipment composition information 91 match each other. In the case in which the formation number 81 of the first positional information and the formation number 81a of the second positional information do not match each other and/or the installation position 82 of the first positional information and the installation position 82a of the second positional information do not match each other, the state history identifier 221 determines that the first positional information within the identification data 90 and the second positional information of the equipment composition information 91 do not match each other.

In the determination of whether the installation position 82 of the first positional information and the installation position 82a of the second positional information match each other, for example, the interior of the specified vehicle is divided into four parts, that is, the front mountain side, the front ocean side, the rearward mountain side, and the rearward ocean side, and the state history identifier 221 of the information processing device 22 determines whether the parts match. Further, these examples are not limiting, the number of parts may be set as desired, and the number of parts may change in accordance with the classification of the equipment 11.

In step ST5, the state history identifier 221 performs association processing to associate the equipment identification number 84 of the identification data 90 with the equipment state information 92. The equipment state information 92 and the equipment composition information 91 are associated with each other via the equipment numbers 85 and 85a, and thus if the equipment identification number 84 of the identification data 90 undergoes association processing to become associated with the equipment state information 92, a state results in which the equipment identification number 84 is associated with both the equipment state information 92 and the equipment composition information 91.

In step ST6, the state history identifier 221 outputs to the equipment state history storage 213 that is the storage device 21 the equipment state information 92a associated with the equipment identification number 84 in step ST5, and the equipment state history storage 213 stores the equipment state information 92a associated with the equipment identification number 84. Then the state history identifier 221 ends the association processing.

Step ST7 is executed in the case in which the first classification information 83 within the identification data 90 and the second classification information 83a in the equipment composition information 91 are determined not to match each other by the state history identifier 221 in step ST3, or in the case in which the first positional information within the identification data 90 and the second positional information within the equipment composition information 91 are determined not to match each other by the state history identifier 221 in step ST4. In step ST7, an entry drafted in a step of the association processing to indicate that the association processing failed is recorded in a log, and is stored in the storage device 21 of the ground-based management device 2. Then the state history identifier 221 ends the association processing. By referring to the log, the worker can easily understand which equipment 11 has a prior association processing failure.

Although no particular limitation is placed on timing of the start of the association processing by the state history identifier 221, the state history identifier 221 may start the association processing upon receiving a signal indicating the start of processing from the maintenance terminal 12. Further, the state history identifier 221 may start the processing upon receiving the identification data 90 from the maintenance terminal 12 in step ST1. Additionally, in the case in which the identification data 90 received from the maintenance terminal 12 is stored in the identification data storage 212, the state history identifier 221 may perform collective association processing for association of the equipment identification numbers 84 with the equipment state information 92 in a night time slot when the train does not travel, for example, or may perform the association processing each time data is newly stored in the vehicle management data storage 211 or the identification data storage 212.

In the information processing system 100 according to Embodiment 1, the train 1 may be a one-car train. In addition, the monitor 142 may hold or acquire information of the equipment 11 mounted on a train other than the train 1 cited in FIG. 1, and the vehicle management data storage 211 may store information from a train 1 other than the train 1 cited in FIG. 1.

In the flowchart of the state history identifier 221 illustrated in FIG. 9, the state history identifier 221 in step ST4 determines whether the first positional information within the identification data 90 and the second positional information of the equipment composition information 91 match each other. Here, in the case in which only a single unit of the equipment 11 is on the train 1, the equipment can be specified when the formation number 81 of the first positional information and the formation number 81a of the second positional information match each other. Thus in the determination of whether the first positional information within the identification data 90 and the second positional information of the equipment composition information 91 match each other, the state history identifier 221 is not necessarily required to determine whether the installation position 82 of the first positional information and the installation position 82a of the second positional information match each other, and thus a configuration may be used that might not make the determination. In this case in which only a single unit of the equipment 11 is in the train 1, when the formation number 81 of the first positional information and the formation number 81a of the second positional information match each other, the state history identifier 221 can determine that the first positional information within the identification data 90 and the second positional information of the equipment composition information 91 match each other. However, when the formation number 81 of the first positional information and the formation number 81a of the second positional information do not match each other, the state history identifier 221 determines that the first positional information within the identification data 90 and the second positional information of the equipment composition information 91 do not match each other.

Further, although the equipment composition information 91, as preset information, is considered to be stored in the monitor 142, such information may be stored in the vehicle management data storage 211 of the ground-based management device 2. In the case in which the equipment composition information 91 is stored in the vehicle management data storage 211 of the ground-based management device 2, the state history identifier 221 in step ST2 acquires the equipment composition information 91 from the vehicle management data storage 211. In this case, a configuration may be used in which the equipment composition information 91 is transmitted to the information processing device 22 of the ground-based management device 2 from the vehicle management device 14 of the train 1 only when the configuration of the equipment 11 is changed.

The maintenance terminal 12 may be configured such that the data received by the ID tag reader 121 or the receiver 122 is not processed by the data generator 124, but rather is transmitted to the information processing device 22 via the identification data outputter 125 and is processed by the state history identifier 221. For example, the maintenance terminal 12 may acquire data from the ID tag 111 provided to the equipment 11, and the first classification information 83 and the equipment identification number 84 of the equipment 11 may be generated by the state history identifier 221 on the basis of the acquired data. Further, the maintenance terminal 12 may receive the electromagnetic or acoustic waves including information of the formation number 81 allocated to the train 1 and generated by the notification device 13 provided for the train 1, and the state history identifier 221 may, on the basis of the received data, generate the formation number 81 allocated to the train 1 and obtained from the first positional information. In addition, the first positional information may further include information indicating the installation position 82 of the equipment 11 within the train 1, and information may be generated, by the state history identifier 221, indicating the installation position 82 of the equipment on the basis of the signal reception strength at the maintenance terminal 12 of the electromagnetic or acoustic waves generated by the notification device 13.

Although the maintenance terminal 12 in Embodiment 1 of the present disclosure is described as a terminal that the worker carries while walking about during work, the function of the maintenance terminal 12 may be served by an industrial robot that moves autonomously within the train 1.

Although an example is indicated in Embodiment 1 of the present disclosure in which the identification data 90 is generated by the maintenance terminal 12, this configuration is not limited, and this data may be generated by the state history identifier 221.

The information processing device 22 of Embodiment 1 in the aforementioned manner includes:

the identification data acquirer 222 to acquire as an output from the maintenance terminal 12 used by the worker (i) the first classification information 83 indicating the classification of equipment 11 mounted on the train 1, (ii) the first positional information including the formation number 81 of the train 1, and (iii) the equipment identification number 84 unique to the equipment;

the vehicle management data acquirer 223 to acquire as an output by the vehicle management device 14 mounted on the train 1 (i) the second classification information 83a indicating the classification of the equipment 11, (ii) the second positional information including the formation number 81a of the train 1, and (iii) the equipment state information 92 that includes at least one of the voltage, the current, the temperature, the hours of operation, the operation frequency, the rotation speed, the frequency, the pressure, or the failure diagnosis result of the equipment 11; and the state history identifier 221 to associate the equipment state information 92 with the equipment identification number 84 upon determination that (i) the first positional information and the second positional information match each other, and (ii) the first classification information and the second classification information match each other.

The information processing system 100 of Embodiment 1 includes:

(a) the information processing device 22 including:
  the identification data acquirer 222 to acquire as an output from the maintenance terminal 12 used by the worker (i) the first classification information 83 indicating the classification of the equipment 11 mounted on the train 1, (ii) the first positional information 81 including the formation number 81a of the train 1, and (iii) the equipment identification number 84 unique to the equipment;
  the vehicle management data acquirer 223 to acquire as an output by the vehicle management device 14 mounted on the train 1 (*i*) the second classification information 83a indicating the classification of the equipment, (ii) the second positional information including the formation number 81a of the train 1, and (iii) the equipment state information 92 that includes at least one of the voltage, the current, the temperature, the hours of operation, the operation frequency, the rotation speed, the frequency, the pressure, or the failure diagnosis result of the equipment; and
  the state history identifier 221 to associate the equipment state information 92 with the equipment identification number 84 upon determination that (i) the first positional information and the second positional information match each other, and (ii) the first classification information 83 and the second classification information 83a match each other;
(b) the vehicle management device 14 that is mounted on the train 1 and outputs the equipment composition information 91 and the equipment state information 92 to the information processing device; and
(c) the storage device 21 to store the equipment state information 92a associating the equipment number.

Further, the information processing method of Embodiment 1 includes:
  acquiring, by the identification data acquirer 222, as an output from the maintenance terminal 12 used by the worker (i) the first classification information 83 indicating the classification of equipment mounted on the train, (ii) the first positional information including the formation number 81 of the train, and (iii) the equipment identification number 84 unique to the equipment;
  acquiring, by the vehicle management data acquirer 223, as an output by the vehicle management device 14 mounted on the train 1 (*i*) the second classification information 83a indicating the classification of the equipment, (ii) the second positional information including the formation number 81a of the train, and (iii) the equipment state information 92 that includes at least one of the voltage, the current, the temperature, the hours of operation, the operation frequency, the rotation speed, the frequency, the pressure, or the failure diagnosis result of the equipment; and
  associating, by the state history identifier 221, the equipment state information 92 with the equipment identification number 84 upon determination that (i) the first positional information and the second positional information match each other, and (ii) the first classification information and the second classification information match each other.

Due to configuration in this manner, even assuming that there is a replacement with the equipment 11 mounted on a different train 1, for example, if the past equipment state information 92 of the replacement equipment 11 exists, then the past equipment state information 92 can be easily associated with the present equipment state information 92 output from the replacement equipment 11. Thus information can be easily constructed relating to the accurate equipment state information 92 of the equipment 11 indicating information such as the operational history and the total hours of operation, and the information relating to the equipment state information 92 can be used for maintenance inspection. Further, an installation location of the equipment 11 can be easily tracked even if an installation location is changed. Thus the information relating to the equipment state information 92 of the equipment 11 can be used appropriately for maintenance inspection.

In addition, by the aforementioned configuration, the state history identifier 221 can perform the processing that associates the equipment state information 92 and the equipment identification number 84 with each other, and thus the association operation can be performed simultaneously with the inspection of the equipment 11, without the requirement for a separate operation by the worker to perform association after the maintenance inspection. Thus the speed of work can be greatly increased.

Further, the information processing device 22 of Embodiment 1 can be configured such that the first classification information and the equipment identification number 84 are acquired by the maintenance terminal 12 from the ID tag 111 provided to the equipment 11, and are then generated by the maintenance terminal 12 or the state history identifier 221.

Due to configuration in this manner, the worker can use the maintenance terminal 12 to read the ID tag 111 provided to the equipment 11 and can easily acquire the tag data 80 from the equipment 11. Thus the speed of work can be greatly increased.

The information processing device 22 of Embodiment 1 can be configured such that the maintenance terminal 12 receives the electromagnetic or acoustic waves generated by the notification device 13 provided to the train 1 and including the information of the formation number 81, that is allocated to the train 1 and obtained from the first positional information, and the information of the formation number 81 is generated by the maintenance terminal 12 or the state history identifier 221.

Due to such configuration, the formation number 81 can be easily deduced by use of the notification device 13 without requiring the worker to input the formation number 81, and thus inputting errors by a worker can be reduced.

The information processing device 22 of Embodiment 1 can be configured such that, the first positional information further includes information indicating the installation position 82 of the equipment 11 within the train 1, and the information indicating the installation position 82 of the equipment 11 is generated by the maintenance terminal 12 or the state history identifier 221 on the basis of the positional information and the signal reception strength at the maintenance terminal 12 for electromagnetic or acoustic waves that are emitted by the notification device 13. A configuration can be used such that, in the comparison between the first positional information and the second positional information, the formation number 81 obtained from the first positional information and the formation number 81a obtained from the second positional information are compared, and further, the installation position 82 of the equipment 11 obtained from the first positional information and the installation position 82a of the equipment 11 obtained from the second positional information are compared, and then the state history identifier 221 determines whether the first positional information and the second positional information match each other.

Due to configuration in this manner, the state history identifier 221 can perform association processing with greater accuracy due to determination, in addition to whether the formation numbers 81 and 81*a* match each other as positional information of the equipment 11, whether the installation positions 82 and 82*a* within the train 1 match each other.

Further, a configuration of the information processing device 22 of Embodiment 1 of the present disclosure can be used in which the train 1 is equipped with multiple notification devices 13 that generate the electromagnetic or acoustic waves, and the maintenance terminal 12 or the state history identifier 221 generates the information indicating the installation position 82 of the equipment 11 of the first positional information on the basis of the positional information of the notification devices 13 and the signal reception strength of the electromagnetic or acoustic waves from the notification devices 13 received by the maintenance terminal 12.

Due to configuration in this manner, accuracy of the estimation of the installation position 82 of the equipment 11 in the first positional information can be improved due to the use of electromagnetic or acoustic waves generated by the notification devices 13.

Embodiment 2

The information processing system 100 according to Embodiment 2 of the present disclosure is described with reference to FIGS. 10 and 11. The information processing system 100 according to Embodiment 1 is described above for the case in which the state history identifier 221 performs processing that associates the equipment state information 92 and the equipment identification number 84 with each other. In Embodiment 2 of the present disclosure, a modified example is described in which the state history identifier 221 performs processing that associates the equipment composition information 91 and the equipment identification number 84 with each other. The description below is mainly about points of difference relative to Embodiment 1.

In Embodiment 2, the state history identifier 221 performs processing to associate the equipment identification number 84 and the equipment composition information 91 with each other. Such processing is performed because, for the equipment composition information 91 and the equipment state information 92, when the equipment identification number 84 of the equipment 11 is associated with the equipment composition information 91 in order to use the equipment numbers 85 and 85*a* for association as indicated in FIGS. 5 and 6, for example, the equipment identification number 84 of the equipment 11 is also associated with the equipment state information 92.

In the information processing system 100 according to Embodiment 2, upon determination that the first positional information and the second positional information match each other, and determination that the first classification information and the second classification information match each other, the state history identifier 221 performs processing to associate the equipment composition information 91 and the equipment identification number 84 with each other. Then the state history identifier 221 outputs to the equipment state history storage 213 equipment composition information 91*a* associated with the equipment state information 92*a*. Upon determination that the first positional information and the second positional information do not match each other, or upon determination that the first classification information 83 and the second classification information 83*a* do not match each other, the state history identifier 221 does not perform processing to associate the equipment composition information 91 and the equipment identification number 84 with each other.

FIG. 10 is a drawing illustrating an example of equipment composition information in which an equipment identification number is associated according to Embodiment 2 of the present disclosure. In FIG. 10, the equipment composition information 91*a* associating the equipment identification number 84 with the equipment composition information 91 illustrated in FIG. 5 is illustrated as an example.

FIG. 11 is a flowchart for description of association processing of the state history identifier of the information processing device according to Embodiment 2. In steps ST1 to ST4 and ST7 in FIG. 11, processing is performed that is similar and corresponds to steps assigned the same numbering in FIG. 9.

In step ST10, the state history identifier 221 performs association processing to associate the equipment identification number 84 of the identification data 90 with the equipment composition information 91. Further, because the equipment state information 92 and the equipment composition information 91 are associated with each other through the equipment numbers 85 and 85*a*, if association processing is performed that associates the equipment identification number 84 of the identification data 90 with the equipment composition information 91, then the equipment identification number 84 becomes associated with both the equipment state information 92 and the equipment composition information 91.

In step ST11, the state history identifier 221 outputs to the equipment state history storage 213 of the storage device 21 the equipment composition information 91*a* and the equipment state information 92*a* associated with the equipment identification number 84 during step ST10. Then the equipment state history storage 213 stores the equipment composition information 91*a* and the equipment state information 92*a* associated with the equipment identification number 84. Then the state history identifier 221 ends the association processing. The state history identifier 221 may be configured so as to output to the equipment state history storage 213 only the equipment composition information 91*a* associated with the equipment identification number 84 in step ST10. In this case, the equipment state information 92 may be acquired from the vehicle management data storage 211.

In the information processing system 100 according to Embodiment 2, although an example is indicated above in which the state history identifier 221 performs association processing to associate the equipment identification number 84 with the equipment composition information 91, the state history identifier 221 may associate the equipment identification number 84 with both the equipment composition information 91 and the equipment state information 92. Including Embodiment 1, upon determination that the first positional information and the second positional information match each other, and that the first classification information 83 and the second classification information 83*a* match each other, the state history identifier 221 performs association processing to associate the equipment identification number 84 with the equipment state information 92 and/or the equipment composition information 91. Then the state history identifier 221 outputs to the equipment state history storage 213 the associated equipment state information 92*a* and the associated equipment composition information 91*a*. In the case in which the first positional information and the second positional information do not match each other, or the first classification information 83 and the second classification information 83a do not match each other, the state history identifier 221 does not perform association processing to associate the equipment identification number 84 with any of the equipment state information 92 and the equipment composition information 91.

Due to association of the equipment identification number 84 with the equipment composition information 91 rather than just with the equipment state information 92, per Embodiment 2 the tracking of the equipment 11 is easier in cases such as when there is a replacement with equipment 11 mounted on a different train 1. Thus equipment 11 included a malfunction in the equipment state information 92, for example, is easily discovered, and such discovery can be used appropriately for maintenance inspection.

Embodiment 3

An information processing system according to Embodiment 3 of the present disclosure is described with reference to FIGS. 12 and 13. Further, in the information processing system 100 according to Embodiment 1, a case is described in which the ground-based management device 2 is equipped with the information processing device 22. In Embodiment 3 of the present disclosure, a configuration is described in which a train 1 is equipped with an information processing device 22a and, from among storage devices 21a and 21b, an identification data storage 212a and a vehicle management data storage 211a. Points of difference relative to Embodiment 1 are mainly described below.

Figure 12:
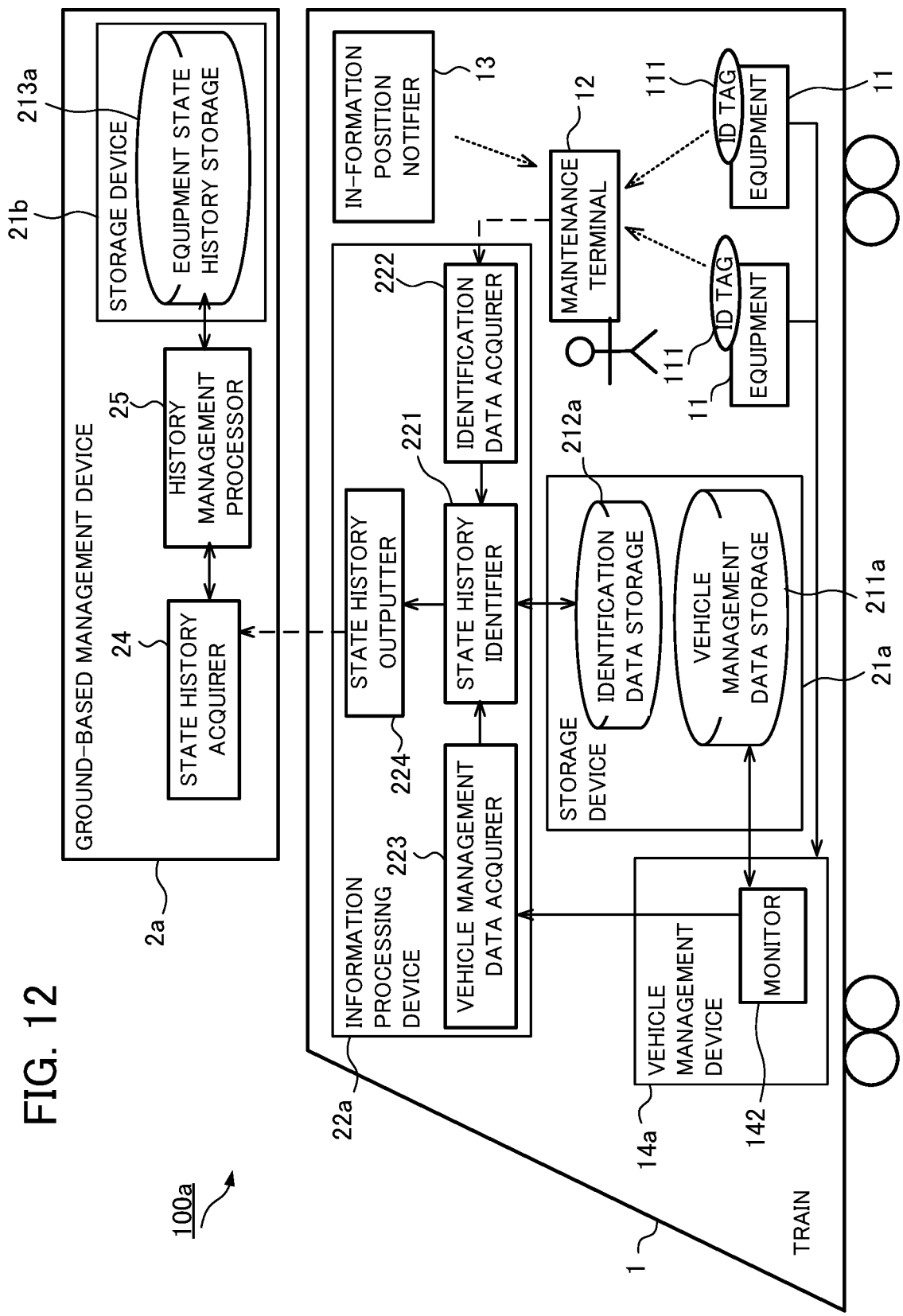
FIG. 12 is a block diagram of an information processing system according to Embodiment 3 of the present disclosure.

FIG. 12 is a block diagram of the information processing system according to Embodiment 3 of the present disclosure. As illustrated in FIG. 12, the information processing system 100a of Embodiment 3 includes the equipment 11, the in-formation position notifier 13, a vehicle management device 14a, the storage device 21a, and the information processing device 22a that are mounted on the train 1, the maintenance terminal 12, and a ground-based management device 2a. The vehicle management device 14a includes the monitor 142. The storage device 21a includes the vehicle management data storage 211a and the identification data storage 212a. The information processing device 22a is equipped with the vehicle management data acquirer 223, the state history identifier 221, the identification data acquirer 222, and a state history outputter 224. The ground-based management device 2a is equipped with a state history acquirer 24, a history management processor 25, and a storage device 21b. The storage device 21b includes an equipment state history storage 213a.

As illustrated in FIG. 12, in contrast with Embodiment 1, the information processing device 22a in Embodiment 3 is mounted on the train 1 rather than mounted on the ground-based management device 2a. Although the equipment state history storage 213a of the storage device 21b is mounted on the ground-based management device 2a in a manner similar to Embodiment 1, the identification data storage 212a and the vehicle management data storage 211a of the storage device 21a are mounted on the train 1. Although the vehicle management device 14a has the monitor 142, the vehicle management device 14a in Embodiment 3 does not have the vehicle management data outputter 141, and is directly connected to the vehicle management data acquirer 223 of the information processing device 22a.

The monitor 142 of the vehicle management device 14a causes storage of the equipment composition information 91 in the vehicle management data storage 211a arranged on the train 1 and can refer to the equipment composition information 91 via the vehicle management data storage 211a.

The information processing device 22a is equipped with the state history identifier 221, the identification data acquirer 222, the vehicle management data acquirer 223, and the state history outputter 224. The state history identifier 221 causes storage of the equipment state information 92 in the identification data storage 212a arranged on the train 1 and can refer to the equipment state information 92 stored by the identification data storage 212a. The state history outputter 224 receives from the state history identifier 221 of the information processing device 22a, and transmits to the state history acquirer 24 of the ground-based management device 2a, the equipment state information 92a associated with the equipment identification number 84. The state history outputter 224 and the state history acquirer 24 are communication devices. Further, the history management processor 25 operates by a processor executing programs stored in a storage.

The history management processor 25 with which the ground-based management device 2a is equipped causes storage of the equipment state information 92a associated with the equipment identification number 84 in the equipment state history storage 213a, and can refer to the equipment state information 92a stored by the equipment state history storage 213a.

Figure 13:
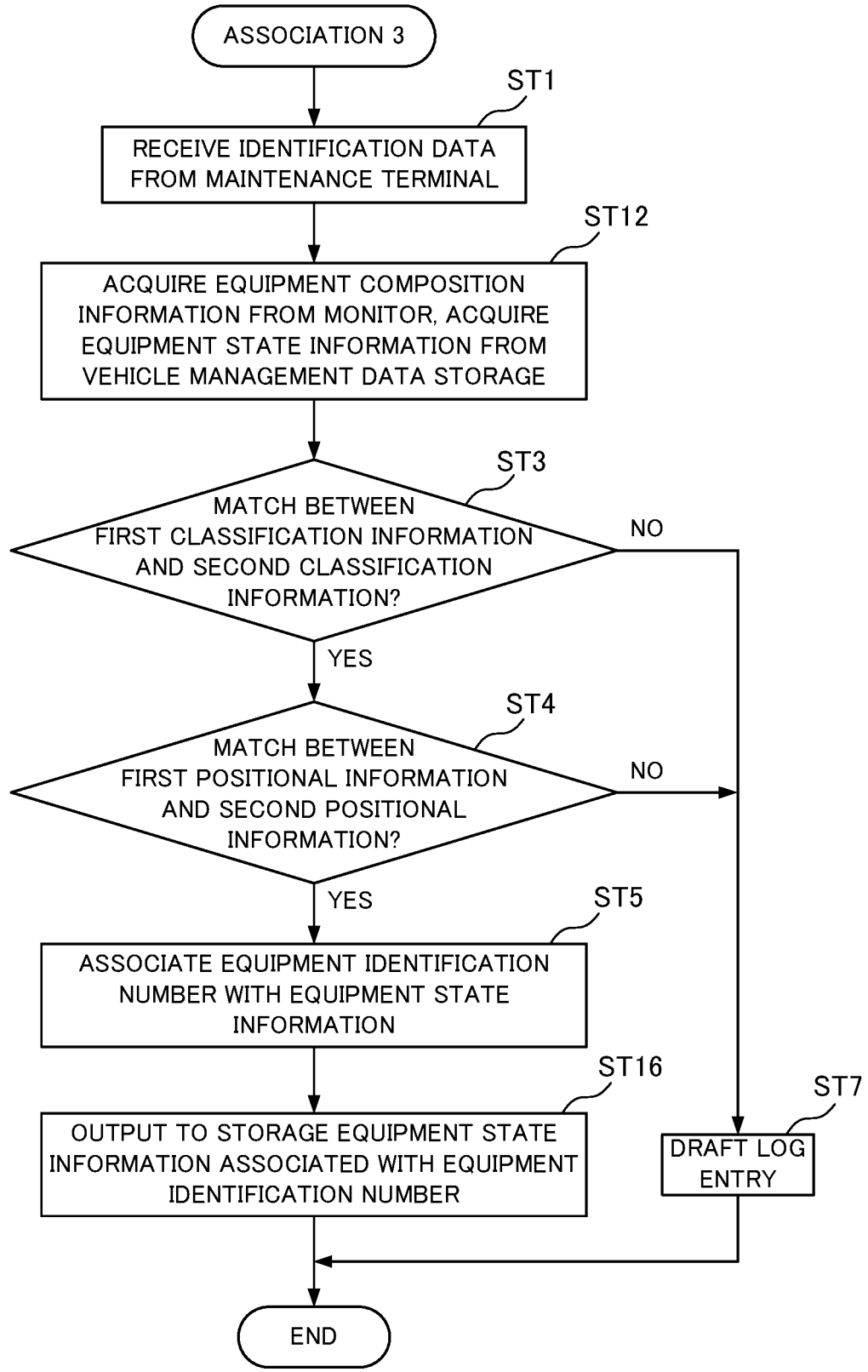
FIG. 13 is a flowchart for description of association processing of a state history identifier of an information processing device according to Embodiment 3.

FIG. 13 is a flowchart for description of association processing of the state history identifier of the information processing device according to Embodiment 3. Steps ST1, ST3, ST4, ST5, and ST7 in FIG. 13 perform operations similar and corresponding to such steps assigned the same numbering in FIG. 9.

In step ST12, the vehicle management data acquirer 223 acquires the equipment state information 92 via the vehicle management device 14a from the vehicle management data storage 211a, and acquires the equipment composition information 91 from the monitor 142. Further, the vehicle management data acquirer 223 may acquire the equipment state information 92 directly from the vehicle management data storage 211a. Further, the equipment composition information 91 may be stored in the vehicle management data storage 211a. In this case, the vehicle management data acquirer 223 may be configured to acquire the equipment composition information 91 and the equipment state information 92 from the vehicle management data storage 211a. The vehicle management data acquirer 223 transmits the acquired equipment composition information 91 or equipment state information 92 to the state history identifier 221.

In step ST16, the state history identifier 221 outputs to the state history outputter 224 the equipment state information 92a associated with the equipment identification number 84 in step ST5. The state history outputter 224 transmits to the state history acquirer 24 the equipment state information 92a associated with the equipment identification number 84, and then the history management processor 25 acquires, and stores in the equipment state history storage 213a of the storage device 21b, the equipment state information 92a associated with the equipment identification number 84. Then the state history identifier 221 ends the association processing.

In Embodiment 3, the vehicle management device 14a and the information processing device 22a may be an integrated unit, and the monitor 142 may have the functions of the state history identifier 221. Further, the vehicle management device 14a may include the identification data storage 212a or the vehicle management data storage 211a.

Due to description of Embodiment 3 as a modified example of Embodiment 1, an example is described above in which the equipment identification number 84 is associated with the equipment state information 92. However, the information processing system 100a according to Embodiment 3 may of course associate the equipment identification number 84 with the equipment composition information 91 in the same manner as in Embodiment 2. In the case of association of the equipment identification number 84 with the equipment composition information 91, step ST10 of FIG. 11 is executed rather than step ST5 of FIG. 13. Further, in the steps corresponding to step ST16, the equipment identification number 84 is associated with the equipment composition information 91 rather than with the equipment state information 92. That is, the state history identifier 221 outputs to the state history outputter 224 the equipment composition information 91a associated with the equipment identification number 84 in step ST10. The state history outputter 224 transmits to the state history acquirer 24 the equipment composition information 91a associated with the equipment identification number 84, and then the history management processor 25 acquires, and causes storage in the equipment state history storage 213a of the storage device 21b, the equipment composition information 91a associated with the equipment identification number 84.

Due to the information processing device 22a, in accordance with the information processing system of Embodiment 3, being provided to the same train 1 as the vehicle management device 14a and the maintenance terminal 12, the state history identifier 221 can obtain information required for performing the association processing without using the state history acquirer 24 and the state history outputter 224. Thus the communication load for the state history acquirer 24 and the state history outputter 224 can be decreased.

Embodiment 4

An information processing system according to Embodiment 4 of the present disclosure is described with reference to FIGS. 14 and 15. A case is described in which an information processing device 22 is provided to the ground-based management device 2 in the information processing system 100 according to Embodiment 1. In Embodiment 4, a modified example is described in which an information processing device 22b is provided spanning a train 1 and a ground-based management device 2b. The description below is mainly about points of difference relative to Embodiment 1.

Figure 14:
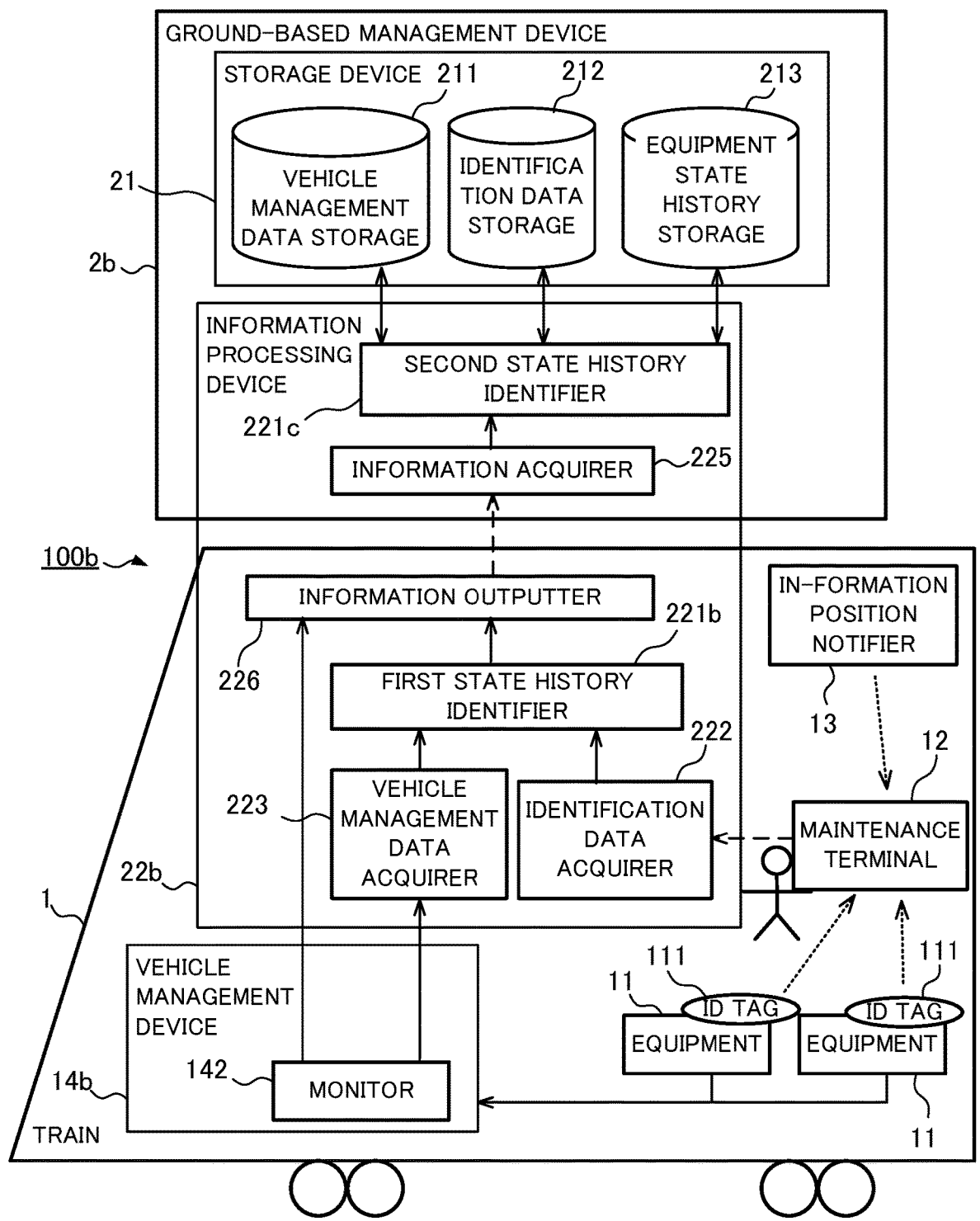
FIG. 14 is a block diagram of an information processing system according to Embodiment 4 of the present disclosure.

FIG. 14 is a block diagram of the information processing system according to Embodiment 4 of the present disclosure. As illustrated in FIG. 14, an information processing system 100b of Embodiment 4 is equipped with the equipment 11, the in-formation position notifier 13, and a vehicle management device 14b that are mounted on the train 1, the maintenance terminal 12, and the ground-based management device 2b, as well as the information processing device 22b provided spanning the train 1 and the ground-based management device 2b. The ground-based management device 2b is equipped with the storage device 21 as well as the second state history identifier and an information acquirer 225 of the information processing device 22b. The identification data acquirer 222, the vehicle management data acquirer 223, a first state history identifier 221b, and the information outputter 226 of the information processing device 22b are provided to the train 1. The storage device 21 has the vehicle management data storage 211, the identification data storage 212, and the equipment state history storage 213. Although the vehicle management device 14b has the monitor 142, the vehicle management device 14b in Embodiment 4 does not have the vehicle management data outputter 141, and is connected directly to the information processing device 22b.

The information processing device 22b has the first state history identifier 221b, the identification data acquirer 222, and the information outputter 226 that are located on the train 1, as well as a second state history identifier 221c and the information acquirer 225 that are located on the ground-based management device 2b. The first state history identifier 221b and the second state history identifier 221c in Embodiment 4 correspond to the state history identifier 221 described in Embodiment 1, and as illustrated in FIG. 14, are divided into the first state history identifier 221b located on the train 1, and the second state history identifier 221c located on the ground-based management device 2b.

The first state history identifier 221b acquires the identification data 90 from the identification data acquirer 222 and acquires the equipment composition information 91 from the vehicle management data acquirer 223. The first state history identifier 221b uses the identification data 90 and the equipment composition information 91 to determine whether the first positional information and the second positional information match each other, and whether the first classification information 83 and the second classification information 83a match each other.

In the case in which the first positional information and the second positional information match each other, and the first classification information 83 and the second classification information 83a match each other, the first state history identifier 221b outputs to the information outputter 226 a determination signal of the determination of matching. In the case in which the first positional information and the second positional information and/or the first classification information 83 and the second classification information 83a are determined not to match each other, the first state history identifier 221b outputs to the identification data acquirer 222 or the monitor 142 a notification indicating the failure of association. The information outputter 226 transmits to the information acquirer 225 the determination signal received from the first state history identifier for the determination of matching, and via the information acquirer 225, the second state history identifier 221c receives the determination signal of the determination of matching.

The monitor 142 of the vehicle management device 14b outputs the equipment state information 92 to the information outputter 226. The information outputter 226 transmits the equipment state information 92 to the information acquirer 225. Upon acquiring the equipment state information 92 via the information acquirer 225, the second state history identifier 221c causes storage of the equipment state information 92 in the vehicle management data storage 211.

In the case in which there is acquisition of the determination signal indicating that the first positional information and the second positional information match each other, and that the first classification information 83 and the second classification information 83a match each other, then the second state history identifier 221c performs processing to associate the equipment identification number 84 and the equipment state information 92 of the equipment 11 with each other. The second state history identifier 221c causes the equipment state history storage 213 to store the equipment identification number 84 in association with the equipment state information 92a.

The information outputter 226 and the information acquirer 225 are communication devices. Further, the first state history identifier 221b and the second state history identifier 221c operate by a processor executing programs stored in a storage.

Figure 15:
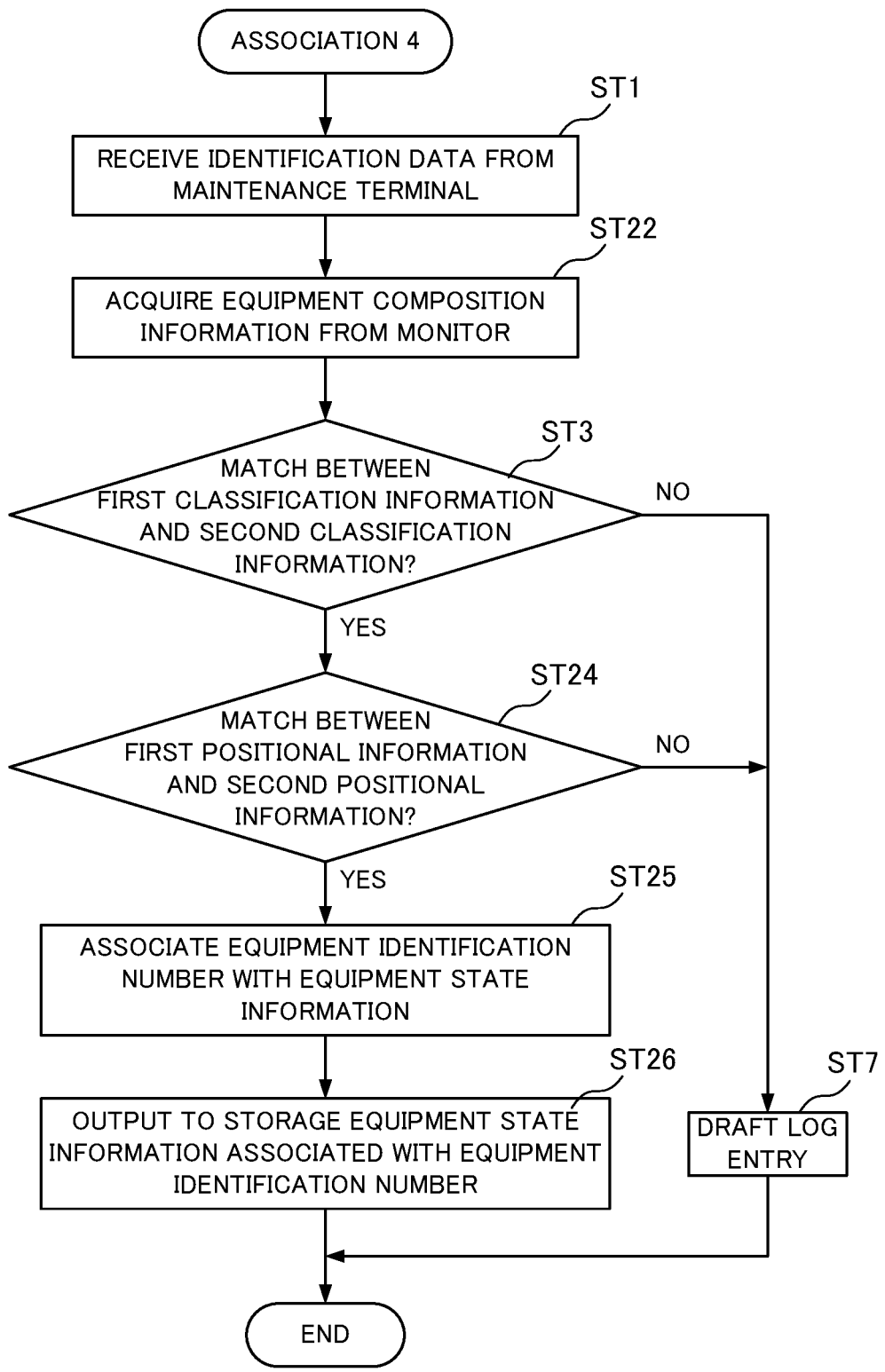
FIG. 15 is a flowchart for description of association processing of a first state history identifier and a second state history identifier of an information processing device according to Embodiment 4.

FIG. 15 is a flowchart for description of association processing of the first state history identifier and the second state history identifier of the information processing device according to Embodiment 4. Steps ST1, ST3, and ST7 in FIG. 15 perform operations similar and corresponding to such steps assigned the same numbering in FIG. 9. Further, the state history identifier 221 in steps ST1, ST3, and ST7 of FIG. 9 corresponds to the first state history identifier 221b in Embodiment 4.

In step ST22, the first state history identifier 221b acquires the equipment composition information 91 from the monitor 142.

In step ST24, the first state history identifier 221b determines whether the first positional information within the identification data 90 and the second positional information of the equipment composition information 91 match each other. Upon determination that the first positional information within the identification data 90 and the second positional information of the equipment composition information 91 match each other, the first state history identifier 221b outputs to the information outputter 226 a determination signal indicating matching, and processing proceeds to step ST25, although upon determination that there is no matching, processing proceeds to step ST7.

In step ST25, upon receiving the determination signal indicating matching output by the first state history identifier 221b in step ST24, the second state history identifier 221c acquires the equipment state information 92 from the vehicle management data storage 211, and the second state history identifier 221c performs association processing to associate the equipment identification number 84 with the equipment state information 92.

In step ST26, the second state history identifier 221c causes storage in the equipment state history storage 213 of the equipment state information 92a associated with the equipment identification number 84 in step ST25. Then the first state history identifier 221b and the second state history identifier 221c end association processing.

In order to describe the information processing system 100b according to Embodiment 4 as a modified example of Embodiment 1, an example is described above in which the equipment identification number 84 is associated with the equipment state information 92. However, the information processing system 100b according to Embodiment 4 may associate the equipment identification number 84 with the equipment composition information 91 in the same manner as in Embodiment 2. In the case of association of the equipment identification number 84 with the equipment composition information 91, upon the second state history identifier 221c, in step ST25 as illustrated in FIG. 15, acquiring the determination signal indicating matching that was output by the first state history identifier 221b in step ST24, the second state history identifier 221c performs association processing to associate the equipment identification number 84 with the equipment composition information 91. Further, in step ST26, the second state history identifier 221c causes storage, in the equipment state history storage 213 of the storage device 21, of the equipment composition information 91a that is associated with the equipment state information 92 and the equipment identification number 84. Then the first state history identifier 221b and the second state history identifier 221c end association processing.

The information processing device 22b is provided spanning the train 1 and the ground-based management device 2b in the information processing system of Embodiment 4, thereby enabling distribution of the processing load of processors for performing the association processing. Further, the vehicle management data storage 211, the identification data storage 212, and the equipment state history storage 213 can be collectively disposed on the ground-based management device 2b, and thus the storage device 21 is easily maintained.

Embodiment 5

In the information processing systems according to Embodiments 1 to 4 of the present disclosure, the state history identifier 221 is described as performing association processing to associate the equipment state information 92 and the equipment identification number 84 with each other. When a large amount of equipment is mounted on the train, providing of the ID tags 111 to all the equipment without omission is difficult. For example, the information processing system 100 according to Embodiment 1, although the failure to associate the equipment identification number 84 and the equipment state information 92 with each other is output in a log, in Embodiment 5, the identification of equipment 11 not provided with the ID tag 111 is supported by notification of the failure to the worker via the maintenance terminal 12.

Figure 16:
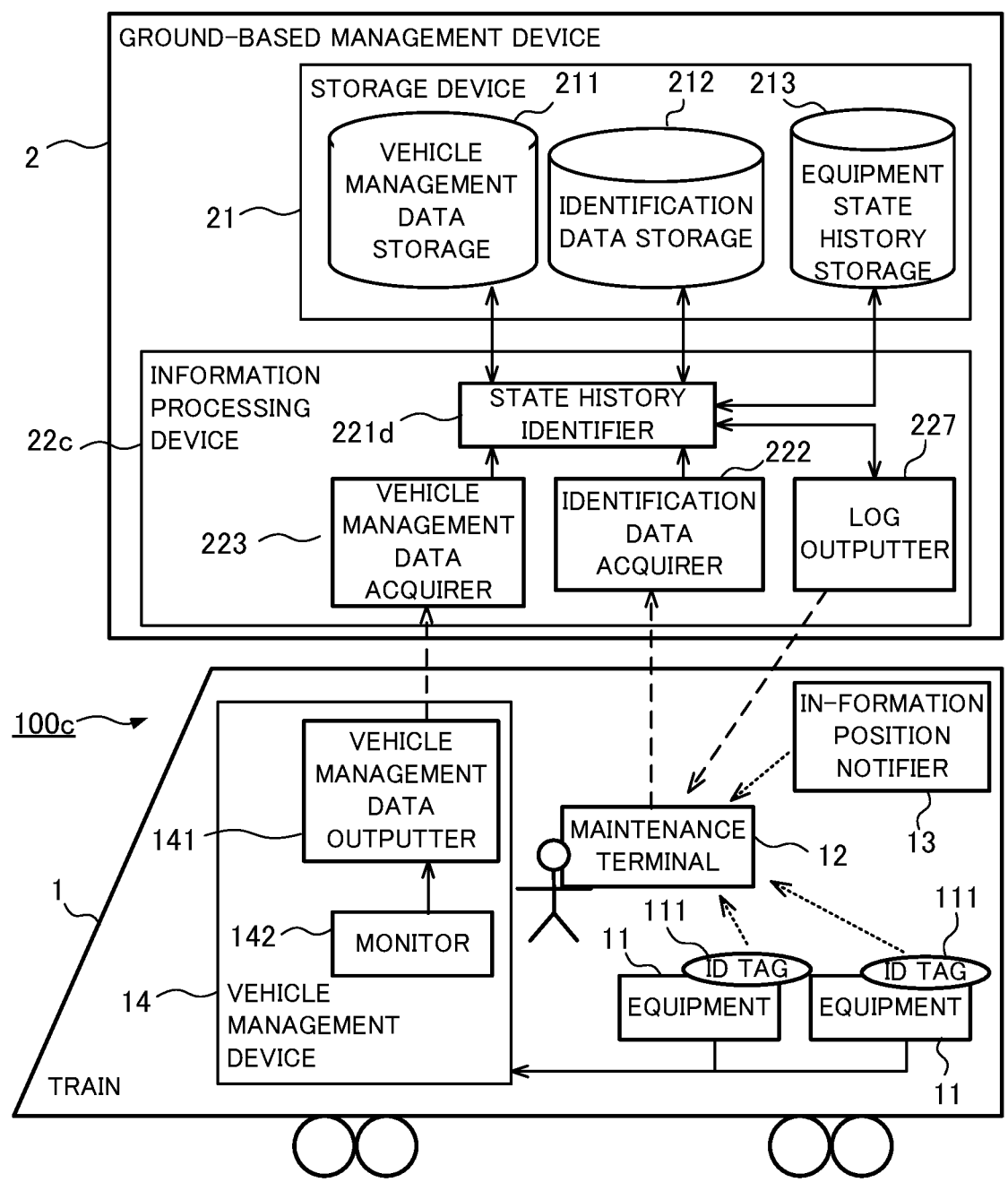
FIG. 16 is a block diagram of an information processing system according to Embodiment 5 of the present disclosure.

FIG. 16 is a block diagram of the information processing system according to Embodiment 5 of the present disclosure. An information processing device 22c of an information processing system 100c of Embodiment 5 as illustrated in FIG. 16 is equipped with a state history identifier 221d, the identification data acquirer 222, the vehicle management data acquirer 223, and a log outputter 227.

In the information processing system 100c according to Embodiment 5, when the first classification information 83 or the first positional information does not exist during association of the equipment state information 92 and the equipment identification number 84 with each other for a certain equipment 11, the state history identifier 221d determines that the ID tag 111 is not provided to the equipment 11 for which the association failed and transmits to the maintenance terminal 12 via the log outputter 227 the second positional information and the second classification information 83a of such equipment.

The state history identifier 221d firstly identifies the equipment for which the equipment identification number 84 is not associated and outputs to the log outputter 227 the second positional information and the second classification information 83a of such equipment. Specifically, among the equipment 11 of the equipment composition information 91 stored in the vehicle management data storage 211, equipment is extracted for which the equipment state information 92a associated with the equipment identification number 84 does not exist in the equipment state history storage.

The log outputter 227 transmits to the maintenance terminal 12 the second positional information and the second classification information 83a of the equipment 11 inputted from the state history identifier 221d. The log outputter 227 is a communication device.

Upon reception of the notification, via the log outputter 227, of the second classification information 83a and the second positional information of the equipment for which the ID tag 111 is not provided, the maintenance terminal 12 provides the worker with the content of the notification. If the maintenance terminal 12 has a display, the maintenance terminal 12 may display the content of the notification on the display; and if the maintenance terminal 12 has a speaker, the worker may be notified of the content of the notification by generation of sound.

Further, the performance of the notification may be based on position of the maintenance terminal 12 within the formation. For example, when the position of the notification device 13 is understood from the electromagnetic or acoustic waves from the notification device 13, among the equipment for which the ID tag 111 is not provided and received from the log outputter 227, the maintenance terminal 12 provides notification of failure if the second positional information matches.

The notification may be output to the monitor 142 rather than to the maintenance terminal 12. Upon reception of such notification, the monitor 142 provides to the worker the content of the notification. For example, if the monitor 142 has a display, the monitor 142 may display the content of the notification on the display; and if the monitor 142 has a speaker, the worker may be notified of the content of the notification by generation of sound.

In accordance with the information processing system of Embodiment 5, information can be provided from the information processing device 22c to the maintenance terminal 12 for equipment for which the equipment identification number 84 is not associated, and thus equipment for which the ID tag 111 is not provided is easily identified, thereby enabling prevention of omitting the appending of the ID tag.

Within the scope of the present disclosure, embodiments may be freely combined, and an embodiment may be appropriately modified or omitted. Although embodiments of the present disclosure are described above, the present disclosure is not limited to these embodiments.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2016-094982, filed on May 11, 2016, the entire disclosure of which is incorporated by reference herein.

REFERENCE SIGNS LIST

1 Train
100, 100a, 100b, 100c Information processing system
11 Equipment
111 ID tag
12, 12a Maintenance terminal
121 ID tag reader
122 Receiver
123 Formation number setter
124 Data generator
125 Identification data outputter
13 In-formation position notifier
14, 14a, 14b Vehicle management device
141 Vehicle management data outputter
142 Monitor
2, 2a, 2b Ground-based management device
21, 21a, 21b Storage device
211, 211a Vehicle management data storage
212, 212a Identification data storage
213, 213a Equipment state history storage
22, 22a, 22b, 22c Information processing device
221, 221d State history identifier
221b First state history identifier
221c Second state history identifier
222 Identification data acquirer
223 Vehicle management data acquirer
224 State history outputter
225 Information acquirer
226 Information outputter
227 Log outputter
24 State history acquirer
25 History management processor

The invention claimed is:

1. An information processing system comprising:
an identification data acquirer to acquire (i) first classification information indicating a classification of equipment mounted on a train, (ii) first positional information including a formation number of the train, and (iii) an equipment identification number unique to the equipment that are transmitted to a maintenance terminal;
a vehicle management data acquirer to acquire (i) second classification information indicating a classification of the equipment, (ii) second positional information including a formation number of the train, and (iii) equipment state information indicating a state of the equipment that are held in a device mounted on the train; and
a state history identifier to associate the equipment state information and the equipment identification number with each other upon determination that (i) the first positional information and the second positional information match each other, and (ii) the first classification information and the second classification information match each other.

2. The information processing system according to claim 1, wherein the first classification information and the equipment identification number are acquired by the maintenance terminal from an ID tag disposed on the equipment, and are generated by the maintenance terminal or the state history identifier.

3. The information processing system according to claim 1, wherein
the maintenance terminal receives electromagnetic or acoustic waves generated by an in-formation position notifier disposed in the train, and
the first positional information is generated by the maintenance terminal or the state history identifier.

4. The information processing system according to claim 1, wherein
the first positional information and the second positional information each further include information indicating an installation position of the equipment within the train, and
the state history identifier determines whether the first positional information and the second positional information match each other by, in the comparison between the first positional information and the second positional information, (i) comparing the formation number obtained from the first positional information and the formation number obtained from the second positional information, and (ii) further comparing the installation position of the equipment obtained from the first positional information and the installation position of the equipment obtained from the second positional information.

5. The information processing system according to claim 4, wherein
the information of the first positional information indicating the installation position of the equipment is generated by the maintenance terminal or the state history identifier based on (i) a signal reception strength of electromagnetic or acoustic waves received by the maintenance terminal and emitted by the in-formation position notifiers disposed on the train and (ii) positional information of the in-formation position notifiers.

6. The information processing system according to claim 1, wherein when the state history identifier determines (i) that the first positional information and the second positional information match each other, and (ii) that the first classification information and the second classification information match each other, the state history identifier further associates the equipment identification number and the equipment composition information with each other, the equipment composition information having (a) the second classification information and (b) the second positional information including the formation number of the train.

7. The information processing system according to claim 1, wherein the state history identifier sends to the maintenance terminal notification of the second classification information and the second positional information corresponding to the equipment state information for which the equipment identification number is not associated.

8. A maintenance terminal used in a management system for managing equipment state information indicating a state of an equipment mounted on a train, the maintenance terminal comprising:
a reader to read an identification information of the equipment mounted on the train;
an inputter to input information about a formation of the train and/or information indicating an installation position of the equipment within the train; and
a data generator to associate the information about the formation of the train and/or the information indicating the installation position of the equipment with the identification information.

9. A maintenance terminal used in a management system for managing equipment state information indicating a state of an equipment mounted on a train, the maintenance terminal being configured to:
read an identification information of the equipment mounted on the train, and information about a formation of the train and/or information indicating an installation position of the equipment within the train, and associate the information about the formation of the train and/or the information indicating the installation position of the equipment with the identification information.

* * * * *